(12) United States Patent
Fukuda

(10) Patent No.: US 10,589,174 B2
(45) Date of Patent: Mar. 17, 2020

(54) STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

(71) Applicant: NINTENDO CO., LTD., Kyoto (JP)

(72) Inventor: Yoshiteru Fukuda, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 116 days.

(21) Appl. No.: 15/715,538

(22) Filed: Sep. 26, 2017

(65) Prior Publication Data

US 2018/0104591 A1   Apr. 19, 2018

(30) Foreign Application Priority Data

Oct. 19, 2016 (JP) ................. 2016-205093

(51) Int. Cl.
| | |
|---|---|
| A63F 13/5255 | (2014.01) |
| A63F 13/837 | (2014.01) |
| A63F 13/211 | (2014.01) |
| A63F 13/5378 | (2014.01) |
| A63F 13/30 | (2014.01) |
| G06F 3/0488 | (2013.01) |
| G06F 3/0481 | (2013.01) |

(Continued)

(52) U.S. Cl.
CPC ........ *A63F 13/5255* (2014.09); *A63F 13/211* (2014.09); *A63F 13/30* (2014.09); *A63F 13/5378* (2014.09); *A63F 13/837* (2014.09); *G06F 3/0488* (2013.01); *A63F 13/2145* (2014.09); *A63F 13/24* (2014.09); *G06F 3/04815* (2013.01)

(58) Field of Classification Search
None
See application file for complete search history.

(56) References Cited

U.S. PATENT DOCUMENTS

| | | | |
|---|---|---|---|
| 2003/0216177 A1 | 11/2003 | Aonuma et al. | |
| 2005/0176502 A1 | 8/2005 | Nishimura et al. | |
| 2008/0174550 A1* | 7/2008 | Laurila | A63F 13/02 345/158 |

FOREIGN PATENT DOCUMENTS

| | | |
|---|---|---|
| JP | 2001-190833 | 7/2001 |
| JP | 2002-200362 | 7/2002 |

(Continued)

OTHER PUBLICATIONS

Borderlands 2 published by 2K Games released Sep. 18, 2012.*

(Continued)

*Primary Examiner* — James S. McClellan
*Assistant Examiner* — Peter J Iannuzzi
(74) *Attorney, Agent, or Firm* — Nixon & Vanderhye, P.C.

(57) ABSTRACT

In an example system according to the present embodiment, on a display, a map image is displayed and superimposed on a game image of a game space as viewed from a virtual camera provided behind a player character. When a user changes the orientation of a controller, the line-of-sight direction of the virtual camera is changed, and at the same time, the position of a cursor on the map image is changed. When the user presses down a predetermined button, a bullet is fired toward the center of a screen. When the user presses down another button, the player character moves to a location indicated by the cursor.

24 Claims, 19 Drawing Sheets

(51) Int. Cl.
　　　*A63F 13/2145*　　　(2014.01)
　　　*A63F 13/24*　　　　(2014.01)

(56) References Cited

FOREIGN PATENT DOCUMENTS

JP　　　2003-325973　　　11/2003
JP　　　2005-218778　　　 8/2005

OTHER PUBLICATIONS

"Borderlands 2: How to Find Upload Samples to Angel Waypoint" published to (https://www.youtube.com/watch?v=l6_37Wx9Mrw ) on Sep. 28, 2012 by skull24).*
"Borderlands 2: Keyboard Controls" published to (http://orcz.conn/Borderlands_2:_Keyboard Controls) last modified on Mar. 4, 2016.*
"Borderlands 2 Multiplayer Gameplay—Local Co-Op Mode Commentary" published to (https://www.youtube.com/watch?v=Tyn1yAR5hfg) on Sep. 14, 2012 by IGN.*
Splatoon 2—Gameplay Walkthrough Part 1—Turf War Multiplayer! Single Player! (Nintendo Switch) by ZackScottGames published by YouTube at (https://www.youtube.com/watch?v=-znt5KitS8E) on Jul. 21, 2017.*
"Tera Gameplay—First Look HD" published to YouTube.com by MMOHuts on Jun. 18, 2012 (https://www.youtube.com/watch?v=wb7-FHM-SKw).*
Phantasy Star Universe, Perfect Bible, Enterbrain, Dec. 11, 2006, first edition, pp. 012-017, p. 718 (11 pages).
Notice of Reasons for Refusal of JP 2016-205093 dated Dec. 19, 2018 (5 pages) and English translation (4 pages).

* cited by examiner

FIG. 11
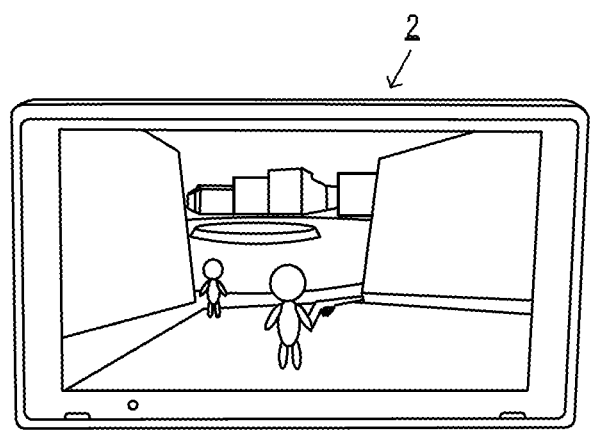
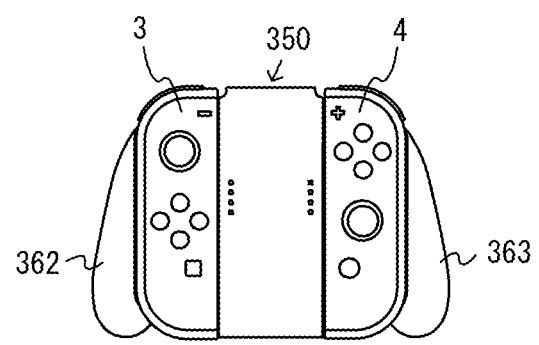

FIG. 12
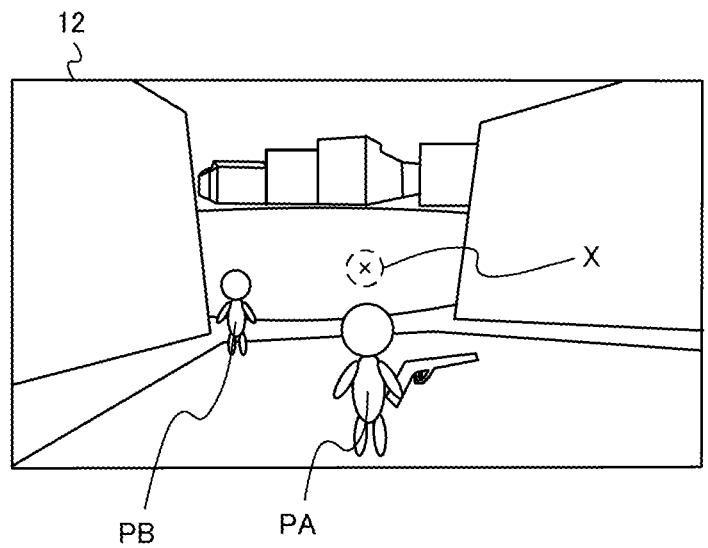
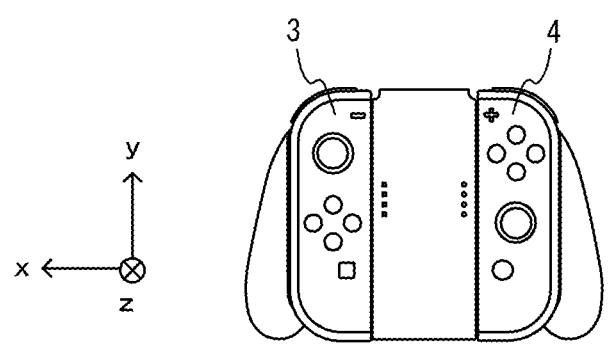

FIG. 13
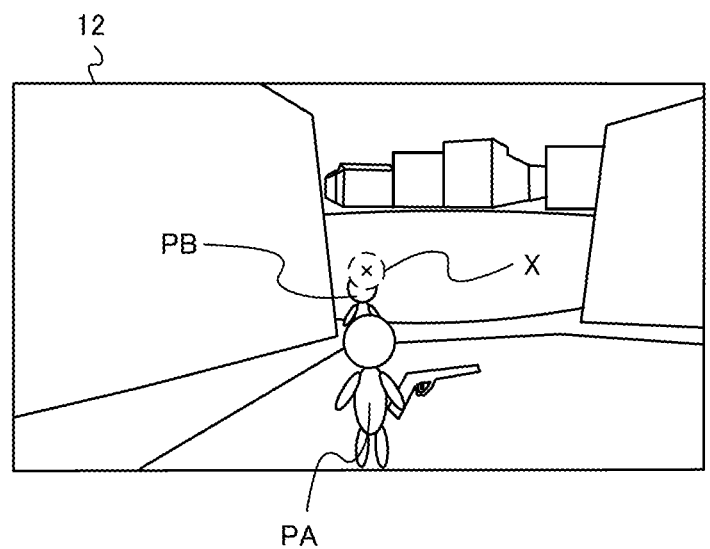
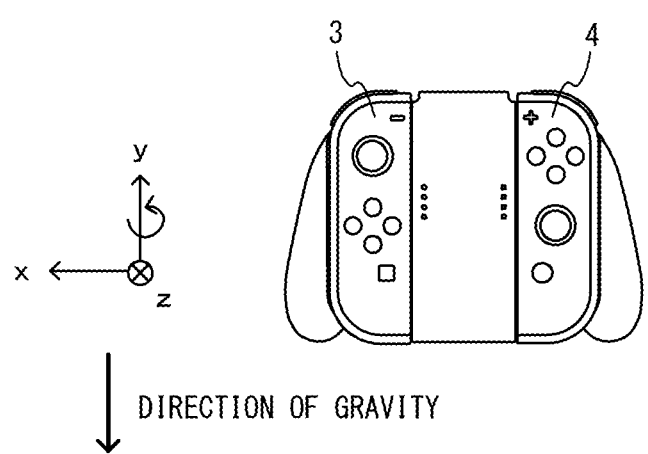
DIRECTION OF GRAVITY

STORAGE MEDIUM HAVING STORED THEREIN INFORMATION PROCESSING PROGRAM, INFORMATION PROCESSING APPARATUS, INFORMATION PROCESSING SYSTEM, AND INFORMATION PROCESSING METHOD

CROSS REFERENCE TO RELATED APPLICATION

The disclosure of Japanese Patent Application No. 2016-205093, filed Oct. 19, 2016, is incorporated herein by reference.

FIELD

The present embodiment relates to information processing programs, information processing apparatuses, information processing systems, and information processing methods.

BACKGROUND AND SUMMARY

Apparatuses for performing a game while allowing two screens to display different images are commonly used. For example, one screen is displaying an image of a virtual space as viewed obliquely while the other screen is displaying an image of the virtual space as viewed from above.

However, it is difficult to apply such a technique directly to control different control objects on a single screen.

With this in mind, it is an object of this embodiment to provide an information processing program that can control different control objects on a single screen.

To achieve the object, this embodiment has the following features.

An information processing program according to an example of this embodiment is an information processing program to be executed by a computer in an information processing apparatus which performs information processing based on an operation performed on an operation section, and causes a display section to display an image. The information processing program causes the computer to execute: an operation data obtaining step of obtaining operation data from the operation section; a first control step of controlling a first control object in a virtual space, based on the operation data; a first image generation step of generating a first image based on control performed on the first control object; a second control activation step of activating control to be performed on a second control object if it is determined based on the operation data that there is a first instruction; a second control step of controlling the second control object, based on the operation data, in addition to the control of the first control object based on the operation data in the first control step, if the control to be performed on the second control object is active; a third image generation step of generating a second image containing the second control object, and generating a third image obtained by superimposing the second image on the first image, if the control to be performed on the second control object is active; and a displaying step of causing the display section to display the first image or the third image.

According to the above feature, when the control to be performed on the second control object is active, the first control object is controlled, and at the same time, the second control object is also controlled, based on operation data from the operation section. A third image is generated that is obtained by superimposing a second image containing the second control object on a first image based on the first control object. As a result, while the third image obtained by superimposing the second image on the first image is being displayed on a single screen, the first control object and the second control object can be simultaneously controlled.

Further, the information processing program may cause the computer to further execute, in the first control step, controlling the first control object, based on first data and second data included in the operation data, and in the second control step, controlling the second control object, based on the first data, and third data included in the operation data.

According to the above feature, the first control object can be controlled, and at the same time, the second control object can be controlled, based on the first data contained in the operation data. Further, the first control object can be controlled based on the second data included in the operation data, and the second control object can be controlled based on the third data included in the operation data. As a result, the two control objects can both be controlled based on a portion of the operation data, and meanwhile, the two control objects can be separately controlled based on another portion of the operation data.

Further, the information processing program may cause the computer to further execute, in the first control step, updating a state of the first control object, based on the first data, and in the second control step, updating a state of the second control object, based on the first data. The information processing program may cause the computer to further execute, in the first control step, performing predetermined information processing based on a state of the first control object if it is determined based on the second data that there is a second instruction. The information processing program may cause the computer to further execute, in the second control step, performing predetermined information processing based on a state of the second control object if it is determined based on the third data that there is a third instruction.

According to the above feature, for example, while the first control object and the second control object are controlled based on the first data, then if there is a second instruction, predetermined information processing is performed based on a state of the first control object, or then if there is a third instruction, another information processing is performed based on a state of the second control object.

Further, the operation section may include at least one of an inertial sensor and a direction input section, and a plurality of keys. The first data may be at least one of data output from the inertial sensor and data related to an operation performed on the direction input section. The second data and the third data may be related to operations performed on different ones of the plurality of keys.

According to the above feature, the first control object and the second control object can be simultaneously controlled based on the first data from an inertial sensor and a direction input section. The first control object and the second control object can be separately controlled based on operations performed on different ones of a plurality of keys.

Further, the first control object may be a first object or a virtual camera in the virtual space. The information processing program may cause the computer to further execute, in the first control step, performing control to move the first object or the virtual camera, based on the operation data.

According to the above feature, the first object or the virtual camera in the virtual space can be controlled based on the operation data.

Further, the first control object may be for determining an aiming point.

According to the above feature, the aiming point can be controlled based on the operation data.

Further, the first control object may be a virtual camera in the virtual space. The first image generated in the first image generation step may be an image of the virtual space generated using the virtual camera.

According to the above feature, the virtual camera can be controlled based on the operation data, and an image captured by the virtual camera can be displayed as a first image.

Further, a predetermined character may be provided in the virtual space. The information processing program may cause the computer to further execute a first movement step of causing the predetermined character to move in the virtual space, based on fourth data included in the operation data.

According to the above feature, the predetermined character in the virtual space can be moved based on the fourth data.

Further, the second image generated in the third image generation step may be a map image of the virtual space. The information processing may be for performing a predetermined game.

According to the above feature, a map image of the virtual space can be displayed. Specifically, the virtual camera can be controlled based on the operation data, and the map image can be displayed and superimposed on a first image of the virtual space captured by the virtual camera.

Further, the second control object may be a cursor displayed on the map image. The information processing program may cause the computer to further execute a second movement step of moving the predetermined character to a position in the virtual space indicated by the cursor if it is determined based on third data included in the operation data that there is a third instruction.

According to the above feature, the location of the predetermined character can be moved to the position of the cursor by controlling the cursor on the map image.

Further, the game may be performed by a plurality of information processing apparatuses operated by a plurality of users. The information processing program may cause the computer to further execute a notification step of giving a notification to another information processing apparatus when the third image is being displayed on the display section. The information processing program may cause the computer to further execute, if receiving the notification from another information processing apparatus, generating the first image which allows for recognition of displaying of the third image on a display section of the other information processing apparatus, in the first image generation step.

According to the above feature, in a game that is played by a plurality of users, a user who is keeping the third image obtained by superimposing the second image on the first image displayed, can be recognized by other users. As a result, a user who is keeping the second image displayed can be recognized by other users, and a situation where a user who is keeping the second image displayed is unduly advantageous can be avoided, so that the balance of the game can be kept.

Further, the information processing program may cause the computer to further execute, in the first image generation step, if the control to be performed on the second control object is inactive, generating the first image in a first form, and if the control to be performed on the second control object is active, generating the first image in a second form which it is more difficult for a user to visually recognize than in the first form. The information processing program may cause the computer to further execute, in the displaying step, if the control to be performed on the second control object is inactive, causing the display section to display the first image in the first form, and if the control to be performed on the second control object is active, causing the display section to display a third image obtained by superimposing the second image of the first image in the second form.

According to the above feature, when the control to be performed on the second control object is active, i.e., the second image is being displayed, the visibility of the first image is reduced, compared to when the second image is not being displayed. As a result, a situation where a user who is keeping the second image displayed is unduly advantageous can be avoided, so that the balance of the game can be kept.

Further, the operation section may be a controller that is attachable to and detachable from the information processing apparatus.

According to the above feature, the above process can be performed using an attachable and detachable operation section.

Further, another example of this embodiment may be an information processing apparatus for executing the above information processing program. Further, still another example may be an information processing system for executing the above process. The information processing system may include one or more apparatuses. Further, still another example may be an information processing method that is performed in the above information processing apparatus or information processing system.

According to this embodiment, a first image and a second image are displayed on a single screen, and a first control object and a second control object can be simultaneously controlled.

These and other objects, features, aspects and advantages of the exemplary embodiments will become more apparent from the following detailed description of the exemplary embodiments when taken in conjunction with the accompanying drawings.

BRIEF DESCRIPTION OF THE DRAWINGS

FIG. 11 is an example non-limiting diagram showing a situation where a game is played using the left controller 3 and the right controller 4 as detached from the main body apparatus 2;

FIG. 12 is an example non-limiting diagram showing an image that is displayed on a display of a main body apparatus of a user A;

FIG. 13 is an example non-limiting diagram showing a game image that is obtained after the left controller 3 and the right controller 4 are rotated about the y-axis of FIG. 12 by a predetermined angle from the state of FIG. 12;

DETAILED DESCRIPTION OF NON-LIMITING EXAMPLE EMBODIMENTS

An information processing system according to an example of an exemplary embodiment is described below. An example of an information processing system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the information processing system 1 can be used as a unified apparatus obtained by attaching each of the left controller 3 and the right controller 4 to the main body apparatus 2. Further, in the information processing system 1, the main body apparatus 2, the left controller 3, and the right controller 4 can also be used as separate bodies (see FIG. 2). Further, the information processing system 1 is used in the following forms: an image is displayed on the main body apparatus 2; and an image is displayed on another display apparatus (e.g., a stationary monitor), such as a television or the like. In the former forms, the information processing system 1 can be used as a handheld apparatus (e.g., a handheld game console). Further, in the latter form, the information processing system 1 can be used as a stationary apparatus (e.g., a stationary game console). It should be noted that the information processing system 1 of this exemplary embodiment can include a wireless controller which is not attached to the main body apparatus 2 (see FIG. 12).

(Description of Main Body Apparatus, Left Controller, and Right Controller)

Figure 1:
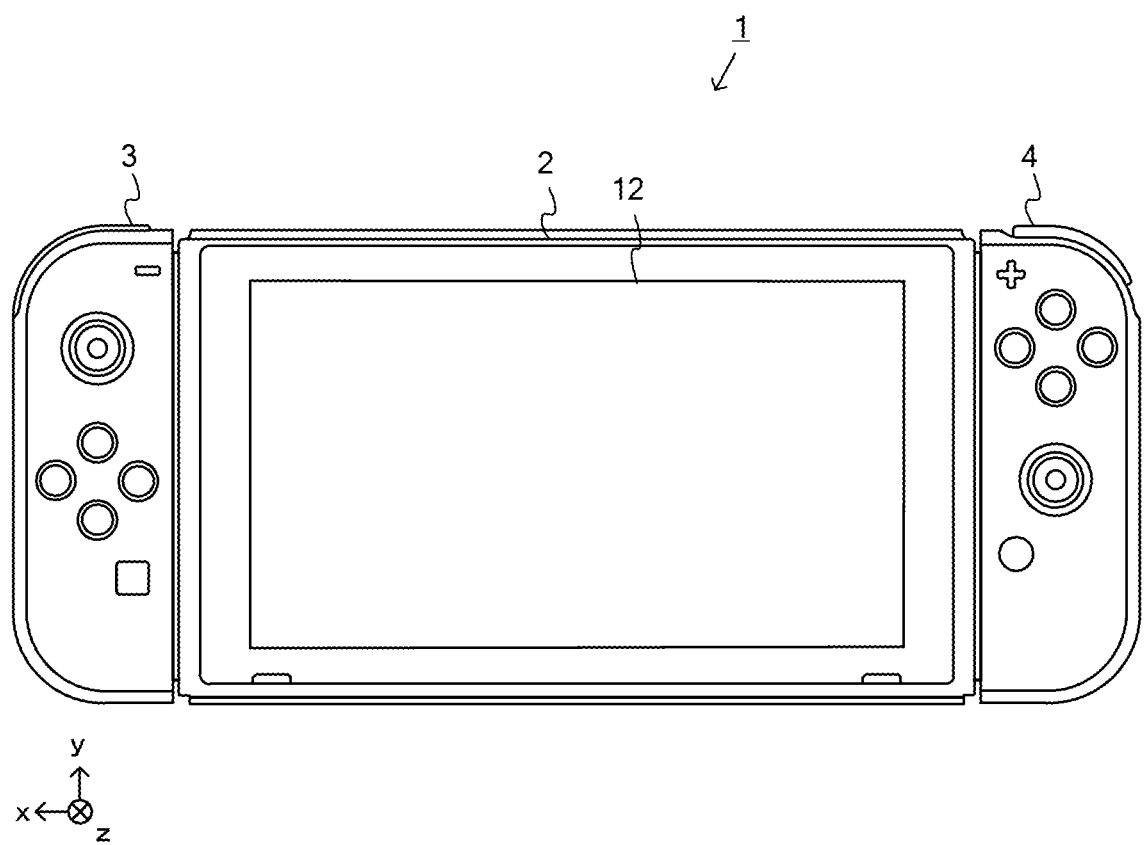
FIG. 1 is an example non-limiting diagram showing a state where a left controller 3 and a right controller 4 are attached to a main body apparatus 2.

FIG. 1 is an example non-limiting diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the information processing system 1. The main body apparatus 2 includes a display 12. Each of the left controller 3 and the right controller 4 is an apparatus including operation sections with which a user provides inputs.

Figure 2:
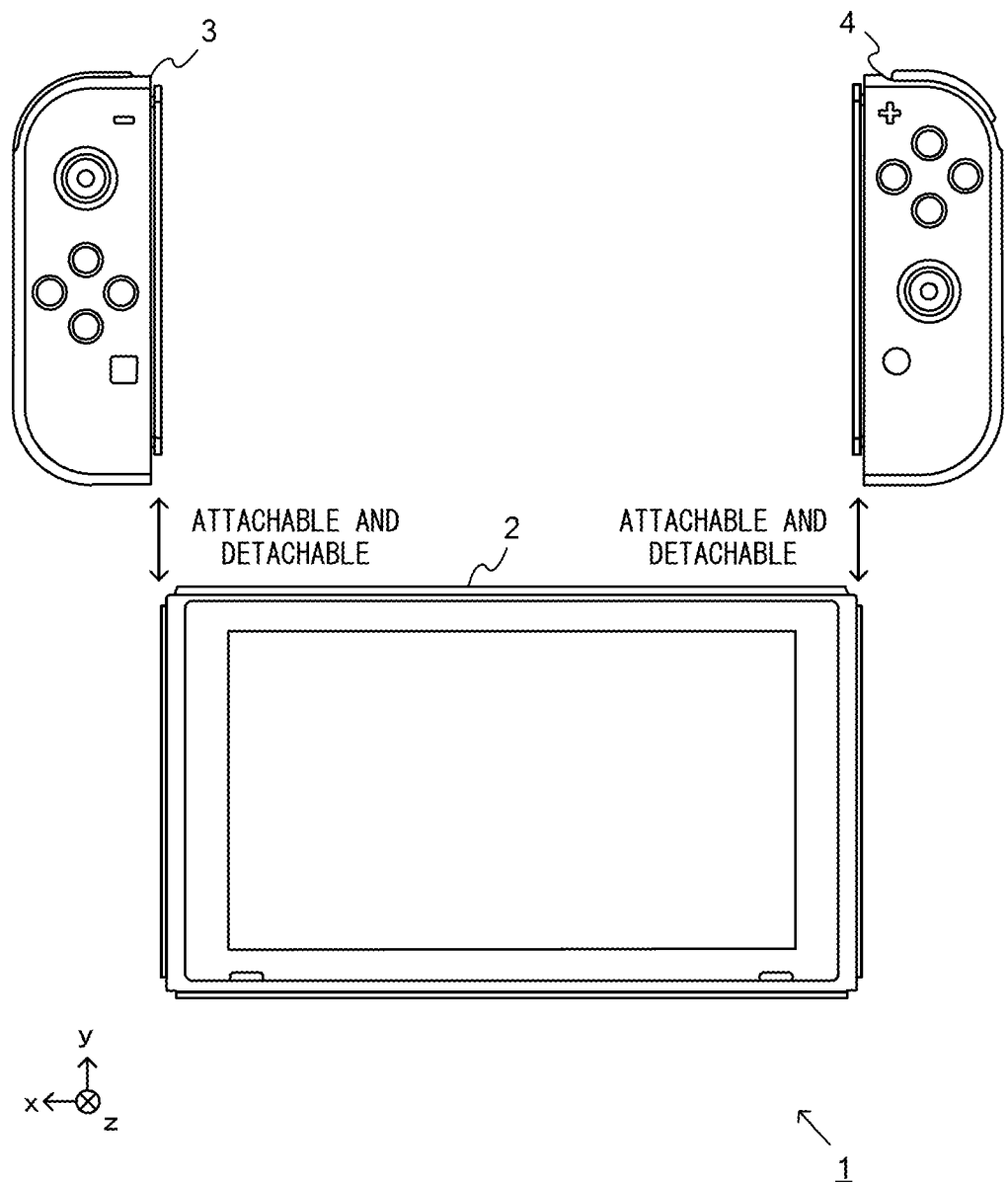
FIG. 2 is an example non-limiting diagram showing a state where each of the left controller 3 and the right controller 4 is detached from the main body apparatus 2.

FIG. 2 is an example non-limiting diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. The left controller 3 can be attached to a left side surface (a side surface in the positive direction of the x-axis shown in FIG. 1) of the main body apparatus 2. The left controller 3 is attachable to and detachable from the main body apparatus 2 by being slid along the left side surface of the main body apparatus 2 in the y-axis direction shown in FIG. 1. Further, the right controller 4 can be attached to a right side surface (a side surface in the negative direction of the x-axis shown in FIG. 1) of the main body apparatus 2. The right controller 4 is attachable to and detachable from the main body apparatus 2 by being slid along the right side surface of the main body apparatus 2 in the y-axis direction shown in FIG. 1. It should be noted that hereinafter, the left controller 3 and the right controller 4 are hereinafter occasionally collectively referred to as "controllers."

Figure 3:
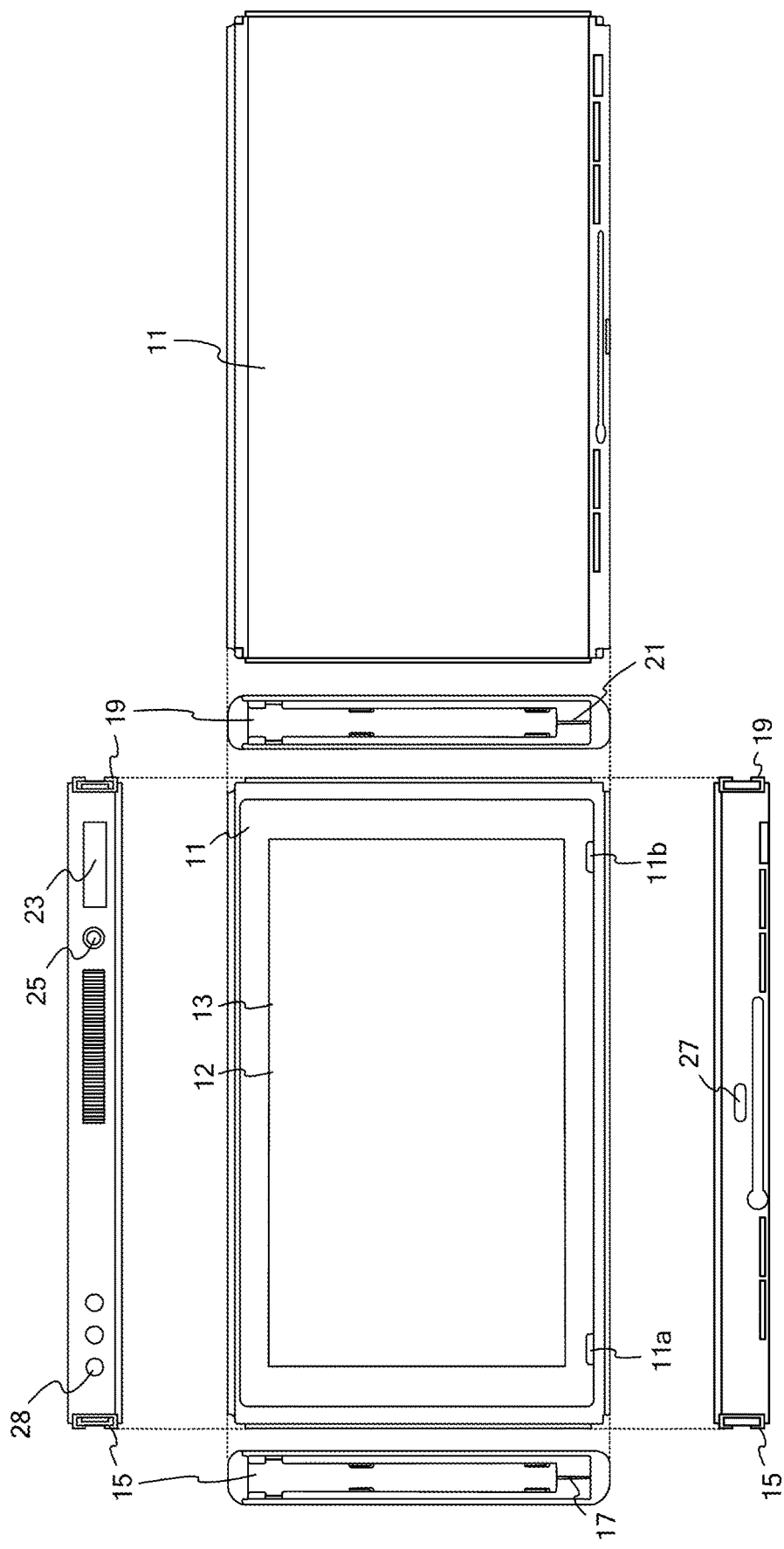
FIG. 3 is an example non-limiting diagram having six orthogonal views showing the main body apparatus 2.

FIG. 3 is an example non-limiting diagram having six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the housing 11 may have any suitable shape and size. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a touch panel 13 on a screen of the display 12. In the exemplary embodiment, the touch panel 13 is of a type that allows a multi-touch input (e.g., a capacitive type). The touch panel 13, however, may be of any type. For example, the touch panel 13 may be of a type that allows a single-touch input (e.g., a resistive type).

The main body apparatus 2 includes speakers (i.e., speakers 88 shown in FIG. 6) within the housing 11. As shown in FIG. 3, speaker holes 11a and 11b are formed on the main surface of the housing 11. Then, sounds output from the speakers 88 are output through the speaker holes 11a and 11b.

As shown in FIG. 3, the main body apparatus 2 includes a left rail member 15 on the left side surface of the housing 11. The left rail member 15 is a member for detachably attaching the left controller 3 to the main body apparatus 2. The left rail member 15 is provided on the left side surface of the housing 11, extending in the vertical direction (the y-axis direction). The left rail member 15 is so shaped as to engage with a slider (i.e., a slider 40 shown in FIG. 4) of the left controller 3. The left rail member 15 and the slider 40 form a slider mechanism. The slider mechanism allows the left controller 3 to be slid and detachably attached to the main body apparatus 2. Further, a right rail member 19 is provided on the right side surface of the housing 11, which has a configuration similar to that of the left rail member 15.

Further, the main body apparatus 2 includes a left terminal 17. The left terminal 17 is a terminal for allowing the main body apparatus 2 to perform wired communication with the left controller 3. The left terminal 17 is provided at a position where the left terminal 17 is made contact with a terminal (a terminal 42 shown in FIG. 4) of the left controller 3 when the left controller 3 is attached to the main body apparatus 2. Further, the main body apparatus 2 includes a right terminal 21. The right terminal 21 is a terminal for allowing the main body apparatus 2 to perform wired communication with the right controller 4. The right terminal 21 is provided at a position where the right terminal 21 is made contact with a terminal (a terminal 64 shown in FIG. 5) of the right controller 4 when the right controller 4 is attached to the main body apparatus 2.

As shown in FIG. 3, the main body apparatus 2 includes a first slot 23. The first slot 23 is provided on an upper side surface of the housing 11. The first slot 23 is so shaped as to allow a first type of storage medium to be attached to the first slot 23. The first type of storage medium is, for example, a dedicated storage medium (e.g., a dedicated memory card) to the information system 1 and an information processing apparatus of the same type as the information system 1. The first type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28. As shown in FIG. 3, the power button 28 is provided on the upper side surface of the housing 11. The power button 28 is a button for turning the main body apparatus 2 on/off.

The main body apparatus 2 includes an audio input/output terminal (specifically, an earphone jack) 25. That is, a microphone or an earphone can be attached to the audio input/output terminal 25 of the main body apparatus 2. As shown in FIG. 3, the audio input/output terminal 25 is provided on the upper side surface of the housing 11.

The main body apparatus 2 includes a lower terminal 27. The lower terminal 27 is a terminal for allowing the main body apparatus 2 to communicate with a cradle. As shown in FIG. 3, the lower terminal 27 is provided on a lower side surface of the housing 11. When the main body apparatus 2 is mounted on the cradle, the lower terminal 27 is connected to a terminal of the cradle. In this example, the lower terminal 27 is a USB connector (more specifically, a female connector). Only the main body apparatus 2 from which the left controller 3 and the right controller 4 are detached can be mounted on the cradle. Further, in still another example, a unified apparatus obtained by attaching the left controller 3 and the right controller 4 to the main body apparatus 2 can be mounted on the cradle. Further, the cradle can communicate with a stationary monitor which is an example of an external display apparatus (e.g., a stationary television) that is separated from the main body apparatus 2 (through wired communication or wireless communication). When the unified apparatus or the main body apparatus 2 alone is mounted on the cradle, the information processing system 1 can display, on the stationary monitor, an image generated by and output from the main body apparatus 2. Further, in this example, the cradle has the function of charging the unified apparatus or the main body apparatus 2 alone mounted on the cradle. Further, the cradle also serves as a hub device (specifically, a USB hub).

Each of the above components (specifically, buttons, slots, terminals, etc.) provided in or on the housing 11 has any suitable shape, number, and arrangement. For example, in another example, some of the power button 28 and the slot 23 may be provided on another side surface or a back surface of the housing 11. Further, in another example, the main body apparatus 2 may not include some of the above components.

Figure 4:
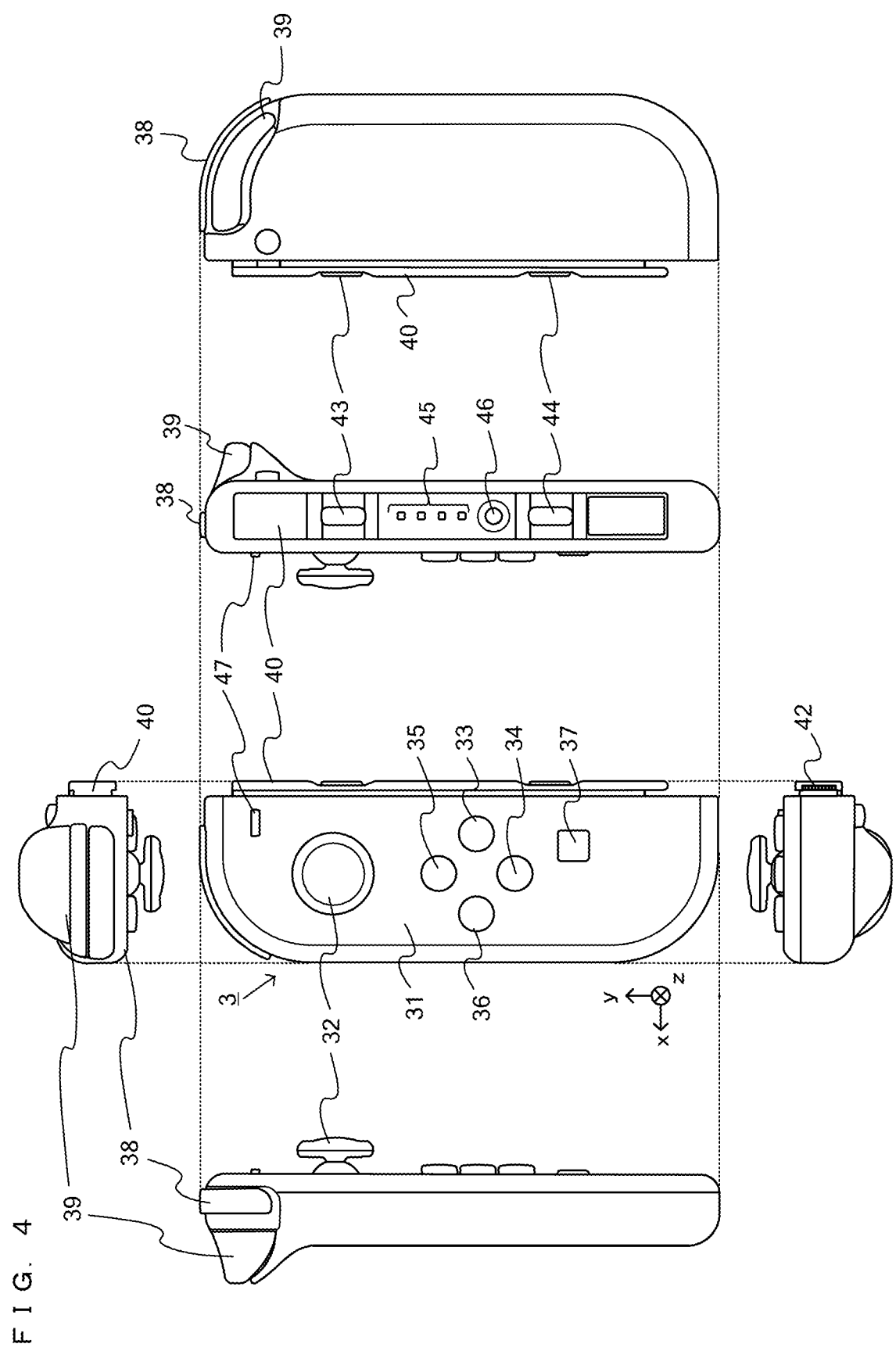
FIG. 4 is an example non-limiting diagram having six orthogonal views showing the left controller 3.

FIG. 4 is an example non-limiting diagram having six orthogonal views showing an example of the left controller 3. As shown in FIG. 4, the left controller 3 includes a housing 31. In this example, the housing 31 is an approximately plate-shaped housing. Further, a main surface (in other words, a surface on a front side, i.e., a surface in the negative direction of the z-axis shown in FIG. 1) has a generally rectangular shape. Further, in this example, the housing 31 is longer than it is wide, i.e., is shaped to be long in a vertical direction (i.e., the y-axis direction shown in FIG. 1). In the state where the left controller 3 is detached from the main body apparatus 2, the left controller 3 can also be held in the orientation in which the left controller 3 is vertically long, i.e., in its portrait orientation. The housing 31 has such a shape and a size that when held in its portrait orientation, the housing 31 can be held by one hand, particularly the left hand. Further, the left controller 3 can also be held in the orientation in which the left controller 3 is horizontally long, i.e., in its landscape orientation. When held in its landscape orientation, the left controller 3 may be held by both hands. It should be noted that the housing 31 may have any suitable shape. In another example, the housing 31 may not be an approximately plate-shaped housing. Further, the housing 31 may not have a rectangular shape. The housing 31 may have a semicircular shape or the like, for example. Further, the housing 31 may not be longer than it is wide.

A vertical length of the housing 31 is substantially the same as that of the housing 11 of the main body apparatus 2. Further, a thickness (i.e., a length in the fore-and-aft direction, or a length in the z-axis direction shown in FIG. 1) of the housing 31 is substantially the same as that of the housing 11 of the main body apparatus 2. Therefore, when the left controller 3 is attached to the main body apparatus 2 (see FIG. 1), the user can hold the main body apparatus 2 and the left controller 3, feeling as if the user held a single apparatus.

The left controller 3 includes an analog stick 32. As shown in FIG. 4, the analog stick 32 is provided on a main surface of the housing 31. The analog stick 32 can be used as a direction input section with which a direction can be input. The analog stick 32 has a stick member that can be tilted in all directions parallel to the main surface of the housing 31 (i.e., 360 degrees around the center, including vertical directions, horizontal directions, and diagonal directions). The user tilts the stick member and thereby can input a direction corresponding to the direction of the tilt (and can input a magnitude corresponding to the angle of the tilt). It should be noted that the left controller 3 may include a directional pad, a slide stick that allows a slide input, or the like as the direction input section, instead of the analog stick. Further, in this example, it is possible to provide an input by pressing down the stick member (in a direction perpendicular to the housing 31). That is, the analog stick 32 is an input section that can be used to provide: an input having a direction and a magnitude corresponding to the tilt direction and the tilt amount, respectively, of the stick member; and an input by the stick member being pressed down.

The left controller 3 includes four operation buttons 33 to 36 (specifically, a "right" button 33, a "down" button 34, an "up" button 35, and a "left" button 36). As shown in FIG. 4, the four operation buttons 33 to 36 are provided on the main surface of the housing 31 below the analog stick 32. The operation buttons 33 to 36 are used to give instructions related to various programs (e.g., an OS program and application programs) executed by the main body apparatus 2. Further, the left controller 3 has a record button 37. Further, the left controller 3 has a "−" (minus) button 47.

When the left controller 3 is attached to the main body apparatus 2, each operation section (specifically, the analog stick 32 and the buttons 33 to 37 and 47) provided on the main surface of the left controller 3 is operated using the thumb of the left hand of the user holding the unified apparatus, for example. Further, when the left controller 3 as detached from the main body apparatus 2 is being held by both hands in its horizontal orientation, the operation sections are operated using the thumbs of both hands of the user holding the left controller 3, for example. Specifically, in this case, the analog stick 32 is operated using the thumb of the left hand of the user, and the operation buttons 33 to 36 are operated using the thumb of the right hand of the user.

The left controller 3 includes a first L-button 38. Further, the left controller 3 includes a ZL-button 39. These operation buttons 38 and 39 are used to give instructions related to various programs executed by the main body apparatus 2, as with the operation buttons 33 to 36. As shown in FIG. 4, the first L-button 38 is provided on an upper left portion of the side surface of the housing 31. Further, the ZL-button 39 is provided on an upper left portion (strictly speaking, an upper left portion of the housing 31 as viewed from the front side) extending from the side surface to the back surface of the housing 31. In other words, the ZL-button 39 is provided behind the first L-button 38 (in the positive direction of the z-axis shown in FIG. 1). When the left controller 3 is attached to the main body apparatus 2, the first L-button 38 and the ZL-button 39 are provided on an upper left portion of the unified apparatus.

The left controller 3 includes the slider 40. As shown in FIG. 4, the slider 40 is provided on the right side surface of the housing 31, extending vertically. The slider 40 is so shaped as to engage with the left rail member 15 (more specifically, a groove of the left rail member 15) of the main body apparatus 2.

Further, the left controller 3 includes the terminal 42 for allowing the left controller 3 to perform wired communication with the main body apparatus 2. The terminal 42 is provided at a position where, when the left controller 3 is attached to the main body apparatus 2, the left controller 3 is made contact with the left terminal 17 (FIG. 3) of the main body apparatus 2.

Further, the left controller 3 includes a second L-button 43 and a second R-button 44. These buttons 43 and 44 are used to give instructions related to various programs executed by the main body apparatus 2, as with the operation buttons 33 to 36. As shown in FIG. 4, the second L-button 43 and the second R-button 44 are provided on the surface to which the slider 40 is to be attached.

The left controller 3 includes a notification LED 45. The notification LED 45 is a notification section for notifying the user of predetermined information. The notification LED 45 notifies the user of any suitable information.

The left controller 3 includes a pairing button 46. In this example, the pairing button 46 is used to give an instruction to perform a setting (also referred to as "pairing") process for wireless communication between the left controller 3 and the main body apparatus 2, and an instruction to perform a process for resetting the left controller 3.

Figure 5:
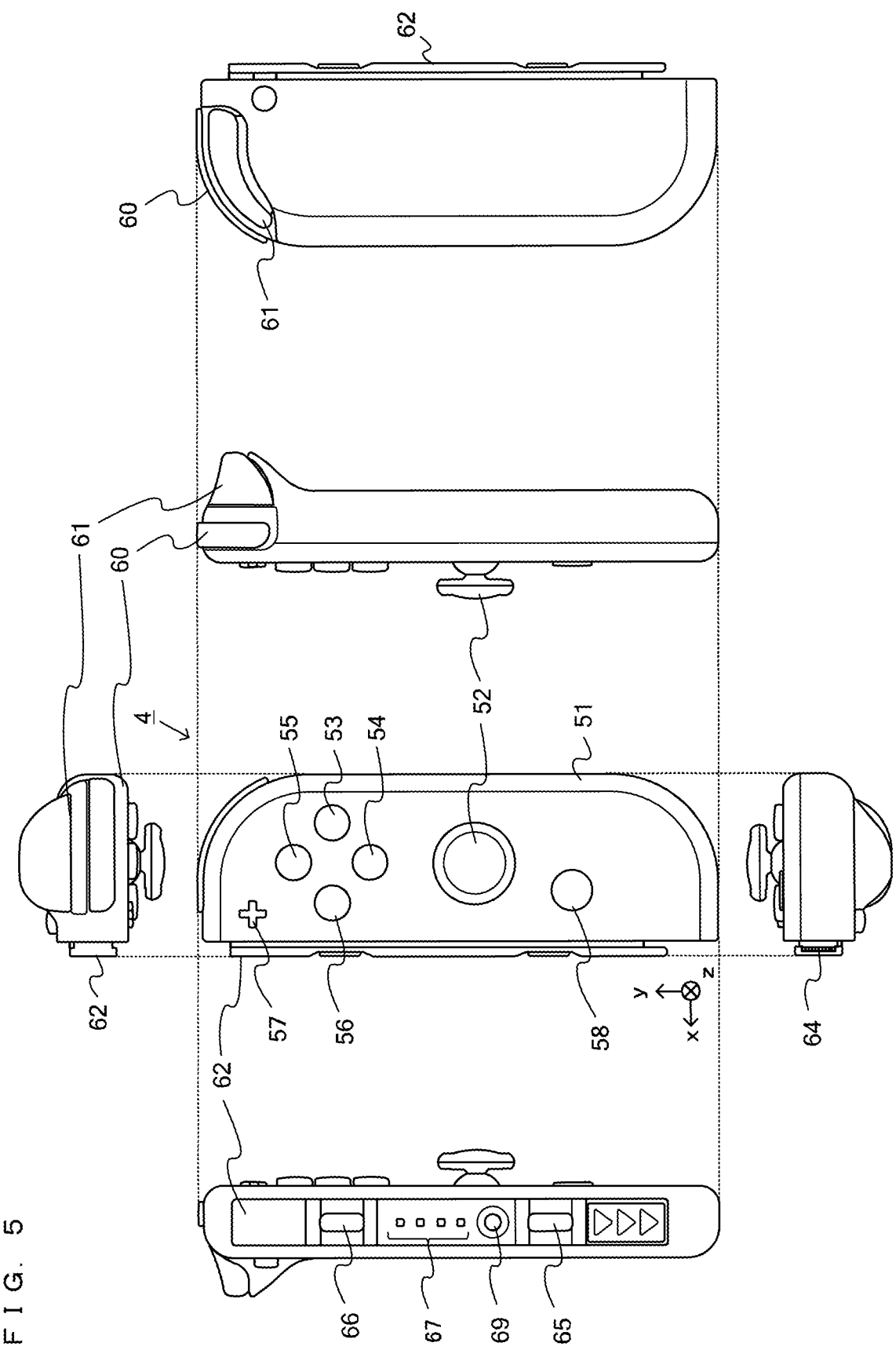
FIG. 5 is an example non-limiting diagram having six orthogonal views showing the right controller 4.

FIG. 5 is an example non-limiting diagram having six orthogonal views showing an example of the right controller 4. As shown in FIG. 5, the right controller 4 includes a housing 51. In this example, the housing 51 is an approximately plate-shaped housing. Further, a main surface (in other words, a surface on a front side, i.e., a surface in the negative direction of the z-axis shown in FIG. 1) of the housing 51 has a generally rectangular shape. Further, in this example, the housing 51 is longer than it is wide, i.e., is shaped to be long in a vertical direction (i.e., the y-axis direction shown in FIG. 1). In the state where the right controller 4 is detached from the main body apparatus 2, the right controller 4 can also be held in the orientation in which the left controller 3 is vertically long, i.e., in its portrait orientation. The housing 51 has such a shape and a size that when held in its portrait orientation, the housing 51 can be held by one hand, particularly the right hand. Further, the right controller 4 can also be held in the orientation in which the right controller 4 is horizontally long, i.e., in its landscape orientation. When held in its landscape orientation, the right controller 4 may be held by both hands.

A vertical length of the housing 51 is substantially the same as that of the housing 11 of the main body apparatus 2, like the housing 31 of the left controller 3. Further, a thickness of the housing 51 is substantially the same as that of the housing 11 of the main body apparatus 2. Therefore, when the right controller 4 is attached to the main body apparatus 2 (see FIG. 1), the user can hold the main body apparatus 2 and the right controller 4, feeling as if the user held a single apparatus.

As with the left controller 3, the right controller 4 includes an analog stick 52 as a direction input section. In this example, the analog stick 52 has the same configuration as that of the analog stick 32 of the left controller 3. Further, the right controller 4 may include a directional pad, a slide stick that allows a slide input, or the like, instead of the analog stick. Further, as with the left controller 3, the right controller 4 includes four operation buttons 53 to 56 (specifically, an A-button 53, a B-button 54, an X-button 55, and a Y-button 56). Further, the right controller 4 includes a "+" (plus) button 57 and a home button 58.

When the right controller 4 is attached to the main body apparatus 2, each operation section (specifically, the analog stick 52 and the buttons 53 to 58) provided on the main surface of the right controller 4 is operated using the thumb of the right hand of the user holding the unified apparatus, for example. Further, when the right controller 4 as detached from the main body apparatus 2 is being held by both hands in its horizontal orientation, the operation sections are operated using the thumbs of both hands of the user holding the right controller 4, for example. Specifically, in this case, the analog stick 52 is operated using the thumb of the left hand of the user, and the operation buttons 53 to 56 are operated using the thumb of the right hand of the user.

The right controller 4 includes a first R-button 60. Further, the right controller 4 includes a ZR-button 61. As shown in FIG. 5, the first R-button 60 is provided on an upper right portion of the side surface of the housing 51. Further, the ZR-button 61 is provided on an upper right portion (strictly speaking, an upper right portion of the housing 51 as viewed from the front side) extending from the side surface to the back surface of the housing 51. In other words, the ZR-button 61 is provided behind the first R-button 60 (in the positive direction of the z-axis shown in FIG. 1).

The right controller 4 includes a slider mechanism similar to the left controller 3. That is, the right controller 4 includes a slider 62.

Further, the right controller 4 includes a terminal 64 for allowing the right controller 4 to perform wired communication with the main body apparatus 2. The terminal 64 is provided at a position where, when the right controller 4 is attached to the main body apparatus 2, the right controller 4 is made contact with the right terminal 21 (FIG. 3) of the main body apparatus 2.

Further, the right controller 4 includes a second L-button 65 and a second R-button 66, as with the left controller 3. These buttons 65 and 66 are used to give instructions related to various programs executed by the main body apparatus 2, as with the operation buttons 53 to 56.

The right controller 4 includes a notification LED 67. The notification LED 67 is a notification section for notifying the user of predetermined information, as with the notification LED 45 of the left controller 3.

The right controller 4 includes a pairing button 69. The pairing button 69 is used to give an instruction to perform a setting (also referred to as "pairing") process for wireless communication between the right controller 4 and the main body apparatus 2, and an instruction to perform a process for resetting the right controller 4.

It should be noted that, in the left controller 3 and the right controller 4, each of the components (specifically, sliders, sticks, buttons, etc.) provided in or on the housing 11 or 51 has any suitable shape, number, and arrangement. For example, in another example, the left controller 3 and the right controller 4 may include a direction input section that is different from an analog stick. Further, the slider 40 or 62 may be provided at a position corresponding to the position of the rail member 15 or 19 provided on the main body apparatus 2, e.g., the main surface or the back surface of the housing 31 or 51. Further, in another example, the left controller 3 and the right controller 4 may not have some of the above components.

Figure 6:
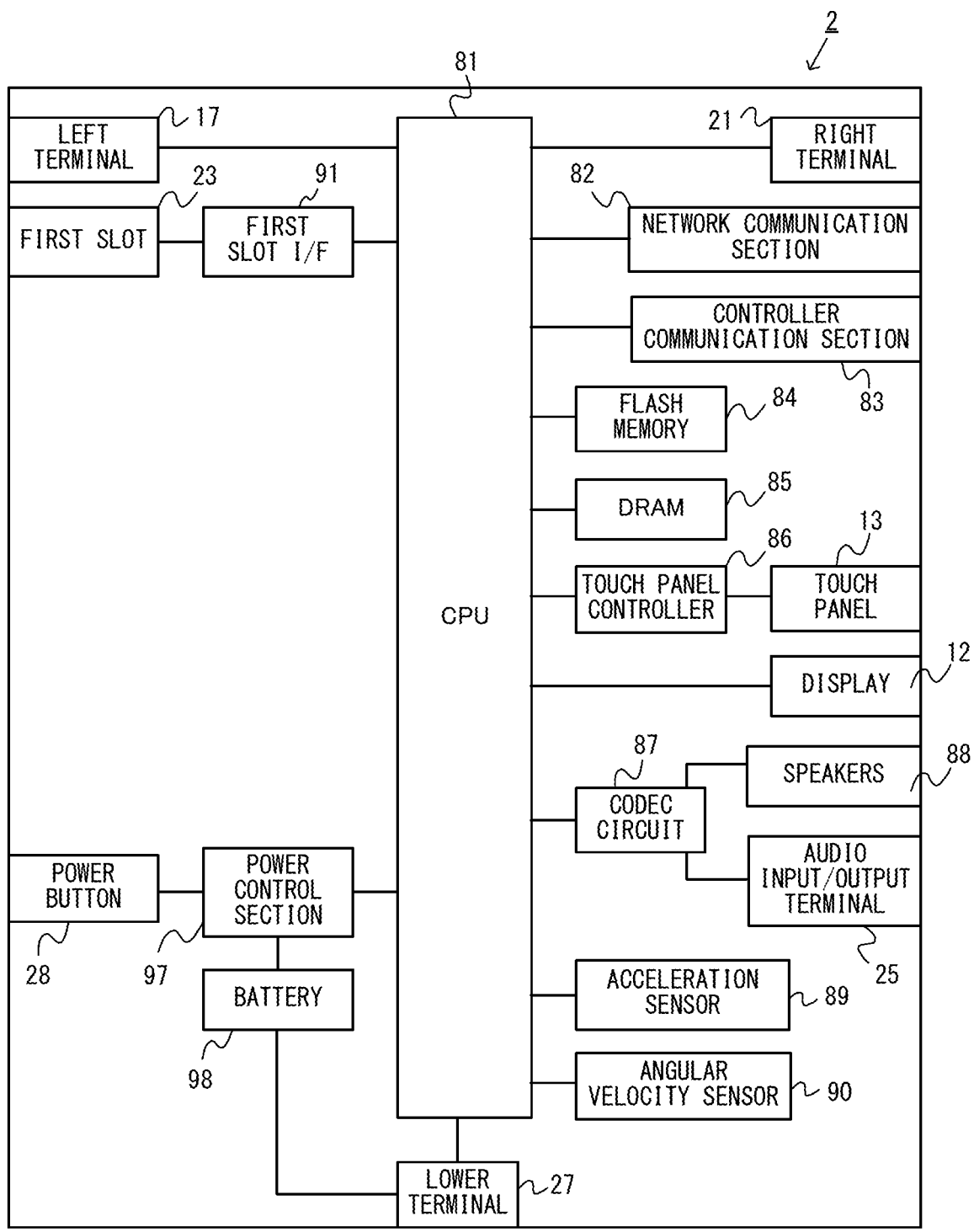
FIG. 6 is an example non-limiting block diagram showing the internal configuration of the main body apparatus 2.

FIG. 6 is a block diagram showing an example of the internal configuration of the main body apparatus 2. The main body apparatus 2 includes components 81 to 98 shown in FIG. 6 in addition to the components shown in FIG. 3. Some of the components 81 to 98 may be implemented as electronic parts on an electronic circuit board, which is accommodated in the housing 11.

The main body apparatus 2 includes a central processing unit (CPU) 81. The CPU 81 is an information processing section for executing various types of information processing to be executed by the main body apparatus 2. Strictly speaking, the CPU 81 may be a system-on-a-chip (SoC) having a plurality of functions such as a CPU function, a graphics processing unit (GPU) function, and the like. The CPU 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a dynamic random access memory (DRAM) 85 as examples of internal storage media built into the main body apparatus 2. The flash memory 84 and the DRAM 85 are coupled to the CPU 81. The flash memory 84 is a memory mainly used to store various data (or programs) to be saved in the main body apparatus 2. The DRAM 85 is a memory used to temporarily store various data used for information processing.

The main body apparatus 2 includes a first slot interface (hereinafter abbreviated to "I/F") 91. The slot I/F 91 is coupled to the CPU 81. The slot I/F 91 is coupled to the slot 23, and in accordance with instructions from the CPU 81, reads and writes data from and to the first type of storage medium (e.g., an SD card) attached to the slot 23.

The CPU 81 appropriately reads and writes data from and to the flash memory 84, the DRAM 85, and each of the above storage media, thereby performing the above information processing.

The main body apparatus 2 includes a network communication section 82. The network communication section 82 is coupled to the CPU 81. The network communication section 82 communicates (specifically, through wireless communication) with an external apparatus via a network. In this example, as a first communication form, the network communication section 82 connects to a wireless LAN and communicates with an external apparatus, using a method compliant with the Wi-Fi standard. Further, as a second communication form, the network communication section 82 wirelessly communicates with another main body apparatus 2 of the same type, using a predetermined communication method (e.g., communication based on a unique protocol or infrared light communication). It should be noted that the wireless communication in the above second communication form achieves the function of enabling so-called "local communication" in which the main body apparatus 2 can wirelessly communicate with another main body apparatus 2 located in a closed local network area, and the plurality of main body apparatuses 2 directly communicate with each other to transmit and receive data.

The main body apparatus 2 includes a controller communication section 83. The controller communication section 83 is coupled to the CPU 81. The controller communication section 83 wirelessly communicates with the left controller 3 and/or the right controller 4. The main body apparatus 2 may communicate with the left controller 3 and the right controller 4 using any suitable communication method. In this example, the controller communication section 83 performs communication compliant with the Bluetooth (registered trademark) standard with the left controller 3 and with the right controller 4.

The CPU 81 is coupled to the left terminal 17, the right terminal 21, and the lower terminal 27. When performing wired communication with the left controller 3, the CPU 81 transmits data to the left controller 3 via the left terminal 17 and also receives operation data from the left controller 3 via the left terminal 17. Further, when performing wired communication with the right controller 4, the CPU 81 transmits data to the right controller 4 via the right terminal 21 and also receives operation data from the right controller 4 via the right terminal 21. Further, when communicating with the cradle, the CPU 81 transmits data to the cradle via the lower terminal 27. As described above, in this example, the main body apparatus 2 can perform both wired communication and wireless communication with each of the left controller 3 and the right controller 4. Further, when the unified apparatus obtained by attaching the left controller 3 and the right controller 4 to the main body apparatus 2 or the main body apparatus 2 alone is attached to the cradle, the main body apparatus 2 can output data (e.g., image data or sound data) to the stationary monitor or the like via the cradle.

Here, the main body apparatus 2 can communicate with a plurality of left controllers 3 simultaneously (in other words, in parallel). Further, the main body apparatus 2 can communicate with a plurality of right controllers 4 simultaneously (in other words, in parallel). Thus, a user or users can simultaneously provide inputs to the main body apparatus 2 using a plurality of left controllers 3 and a plurality of right controllers 4.

The main body apparatus 2 includes a touch panel controller 86 which is a circuit for controlling the touch panel 13. The touch panel controller 86 is coupled between the touch panel 13 and the CPU 81. Based on a signal from the touch panel 13, the touch panel controller 86 generates, for example, data indicating a position where a touch input has been performed. The touch panel controller 86 outputs the data to the CPU 81.

Further, the display 12 is coupled to the CPU 81. The CPU 81 displays a generated image (e.g., an image generated by executing the above information processing) and/or an externally acquired image on the display 12.

The main body apparatus 2 includes a codec circuit 87 and speakers (specifically, a left speaker and a right speaker) 88. The codec circuit 87 is coupled to the speakers 88 and a audio input/output terminal 25 and also coupled to the processor 81. The codec circuit 87 is a circuit for controlling the input and output of sound data to and from the speakers 88 and the audio input/output terminal 25.

Further, the main body apparatus 2 includes an acceleration sensor 89. In this example, the acceleration sensor 89 detects the magnitudes of accelerations along predetermined three axial (e.g., x-, y-, and z-axes shown in FIG. 1) directions. It should be noted that the acceleration sensor 89 may detect an acceleration along one axial direction or accelerations along two axial directions.

Further, the main body apparatus 2 includes an angular velocity sensor 90. In this example, the angular velocity sensor 90 detects angular velocities about predetermined three axes (e.g., the x-, y-, and z-axes shown in FIG. 1). It should be noted that the angular velocity sensor 90 may detect an angular velocity about one axis or angular velocities about two axes.

The acceleration sensor 89 and the angular velocity sensor 90 are coupled to the CPU 81, and the detection results of the acceleration sensor 89 and the angular velocity sensor 90 are output to the processor 81. Based on the detection results of the acceleration sensor 89 and the angular velocity sensor 90, the CPU 81 can calculate information regarding the motion and/or the orientation of the main body apparatus 2. It should be noted that, in this exemplary embodiment, an acceleration sensor and an angular velocity sensor are used as inertial sensors for calculating a motion, an orientation, and/or a position of the main body apparatus 2. In another exemplary embodiment, other sensors may be used.

The main body apparatus 2 includes a power control section 97 and a battery 98. The power control section 97 is coupled to the battery 98 and the CPU 81. Further, although not shown, the power control section 97 is coupled to components of the main body apparatus 2 (specifically, components that receive power supplied from the battery 98, the left terminal 17, and the right terminal 21). Based on a command from the CPU 81, the power control section 97 controls the supply of power from the battery 98 to the above components. Further, the power control section 97 is coupled to the power button 28. The power control section 97 controls the supply of power to each section based on an input to the power button 28. That is, when an operation of turning off is performed on the power button 28, the power control section 97 stops supplying power to all or a portion of the above sections. When an operation of turning on is performed on the power button 28, the power control section 97 starts supplying power all or a portion of the above sections. Further, the power control section 97 outputs information indicating an input to the power button 28 (specifically, information indicating whether or not the power button 28 has been pressed down) to the CPU 81.

Further, the battery 98 is coupled to the lower terminal 27. When an external charging device (e.g., the cradle) is connected to the lower terminal 27, and power is supplied to the main body apparatus 2 via the lower terminal 27, the battery 98 is charged with the supplied power.

Figure 7:
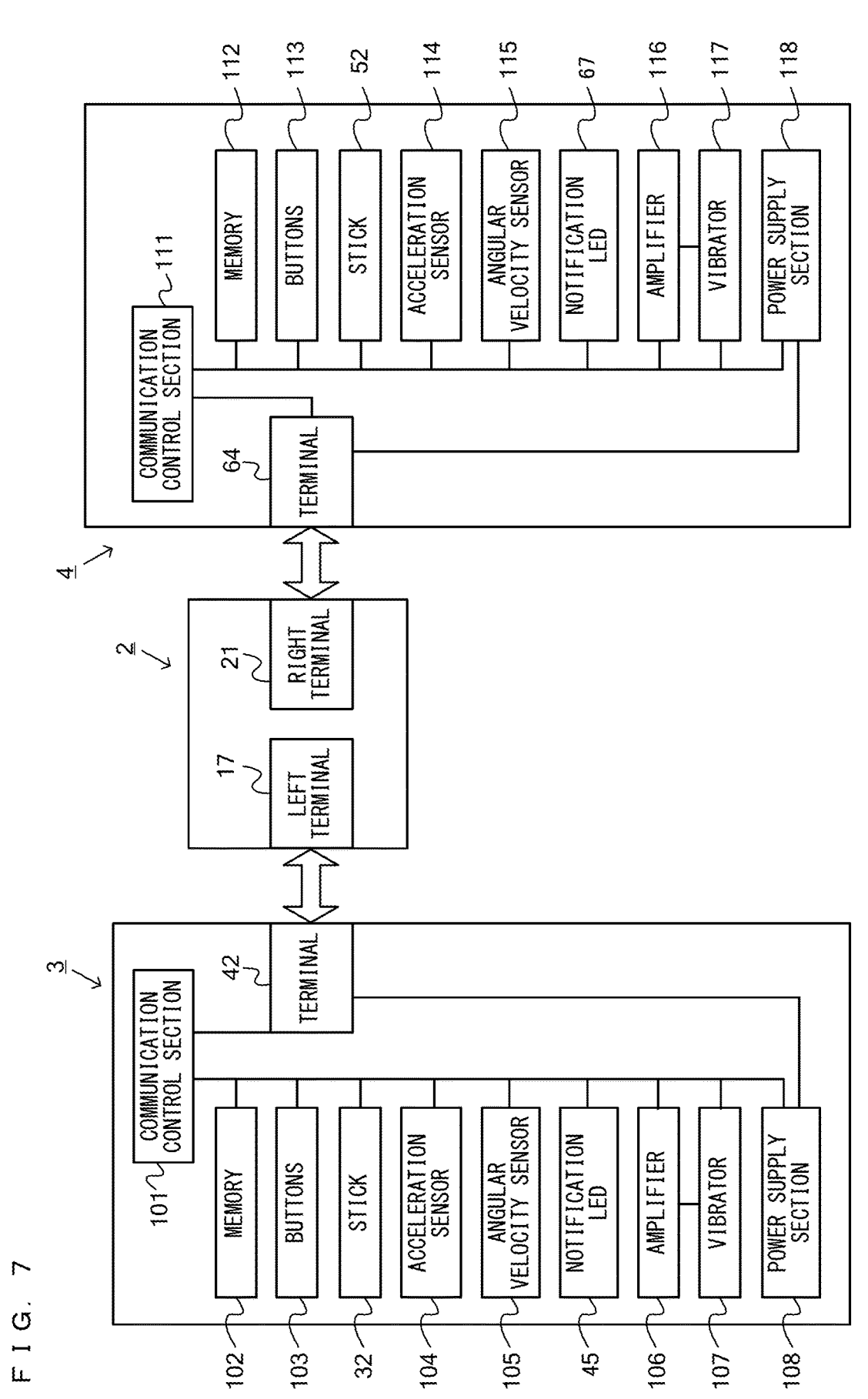
FIG. 7 is an example non-limiting block diagram showing the internal configurations of the main body apparatus 2, the left controller 3, and the right controller 4.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are not shown in FIG. 7.

The left controller 3 includes a communication control section 101 which communicates with the main body apparatus 2. As shown in FIG. 7, the communication control section 101 is coupled to components including the terminal 42. In this example, the communication control section 101 can communicate with the main body apparatus 2 through both wired communication via the terminal 42 and wireless communication without using the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timings.

The left controller 3 includes inertial sensors. Specifically, the left controller 3 includes an acceleration sensor 104. Further, the left controller 3 includes an angular velocity sensor 105. In this example, the acceleration sensor 104 detects the magnitudes of accelerations along predetermined three axial (e.g., x-, y-, and z-axes shown in FIG. 4) directions. It should be noted that the acceleration sensor 104 may detect an acceleration along one axial direction or accelerations along two axial directions. In this example, the angular velocity sensor 105 detects angular velocities about predetermined three axes (e.g., the x-, y-, and z-axes shown in FIG. 4). It should be noted that the angular velocity sensor 105 may detect an angular velocity about one axis or angular velocities about two axes. Each of the acceleration sensor 104 and the angular velocity sensor 105 is coupled to the communication control section 101. Then, the detection results of the acceleration sensor 104 and the angular velocity sensor 105 are output to the communication control section 101 repeatedly at appropriate timings.

The communication control section 101 acquires information regarding an input (specifically, information regarding an operation or the detection result of a sensor) from each of input sections (specifically, the buttons 103, the analog stick 32, and the sensors 104 and 105). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations performed on the buttons 103 and the analog stick 32 based on the operation data. Further, the main body apparatus 2 can calculate information regarding the motion and/or the orientation of the left controller 3 based on the operation data (specifically, the detection results of the acceleration sensor 104 and the angular velocity sensor 105).

Further, the notification LED 45 is coupled to the communication control section 101. In this exemplary embodiment, the notification LED 45 is controlled in accordance with a command from the main body apparatus 2. That is, the communication control section 101, when receiving the command from the main body apparatus 2, outputs a control signal for performing control to turn on the notification LED 45, to the notification LED 45, in accordance with the command.

The left controller 3 includes a vibrator 107 for giving notification to the user by a vibration. In this example, the vibrator 107 is controlled in accordance with a command from the main body apparatus 2. That is, the communication control section 101, when receiving the above command from the main body apparatus 2, drives the vibrator 107 in accordance with the received command. Here, the left controller 3 includes an amplifier 106. The communication control section 101, when receiving the above command, outputs a control signal corresponding to the command to the amplifier 106. The amplifier 106 amplifies the control signal from the communication control section 101 to generate a driving signal for driving the vibrator 107, and outputs the drive signal to the vibrator 107. Thus, the vibrator 107 is operated.

The left controller 3 includes a power supply section 108. In this example, the power supply section 108 includes a battery and a power control circuit. Although not shown, the power control circuit is coupled to the battery and also coupled to components of the left controller 3 (specifically, components that receive power supplied from the battery). The power control circuit controls the supply of power from the battery to each of the above sections. Further, the battery is coupled to the terminal 42. In this example, when the left controller 3 is attached to the main body apparatus 2, the battery is charged with power supplied from the main body apparatus 2 via the terminal 42, under predetermined conditions.

As shown in FIG. 7, the right controller 4 includes a communication control section 111 which communicates with the main body apparatus 2. Further, the right controller 4 includes a memory 112 which is coupled to the communication control section 111. The communication control section 111 is coupled to components including the terminal 64. The communication control section 111 and the memory 112 have functions similar to those of the communication control section 101 and the memory 102, respectively, of the left controller 3. Thus, the communication control section 111 can communicate with the main body apparatus 2 through either wired communication via the terminal 64 or wireless communication without using the terminal 64 (specifically, communication compliant with the Bluetooth (registered trademark) standard). The communication control section 111 controls a communication method that is performed by the right controller 4 with respect to the main body apparatus 2.

The right controller 4 includes input sections similar to those of the left controller 3. Specifically, the right controller 4 includes buttons 113, an analog stick 52, and inertial sensors (an acceleration sensor 114 and an angular velocity sensor 115). These input sections have functions similar to those of the input sections of the left controller 3 and operate in manners similar to those of the input sections of the left controller 3.

The notification LED 67 of the right controller 4 operates in a manner similar to that of the notification LED 45 of the left controller 3. That is, the communication control section 111, when receiving a command from the main body apparatus 2, outputs a control signal for performing control to turn on the notification LED 67, to the notification LED 67, in accordance with the command.

Further, the right controller 4 includes a vibrator 117 and an amplifier 116. The vibrator 117 and the amplifier 116 operate in manners similar to those of the vibrator 107 and the amplifier 106 of the left controller 3. That is, the communication control section 111 operates the vibrator 117 using the amplifier 116 in accordance with a command from the main body apparatus 2.

The right controller 4 includes a power supply section 118. The power supply section 118 has a function similar to that of the power supply section 108 of the left controller 3, and operates in a similar manner. That is, the power supply section 118 controls the supply of power from the battery to each of sections that need power. Further, when the right controller 4 is attached to the main body apparatus 2, the battery is charged with power supplied from the main body apparatus 2 via the terminal 64, under predetermined conditions.

Figure 8:
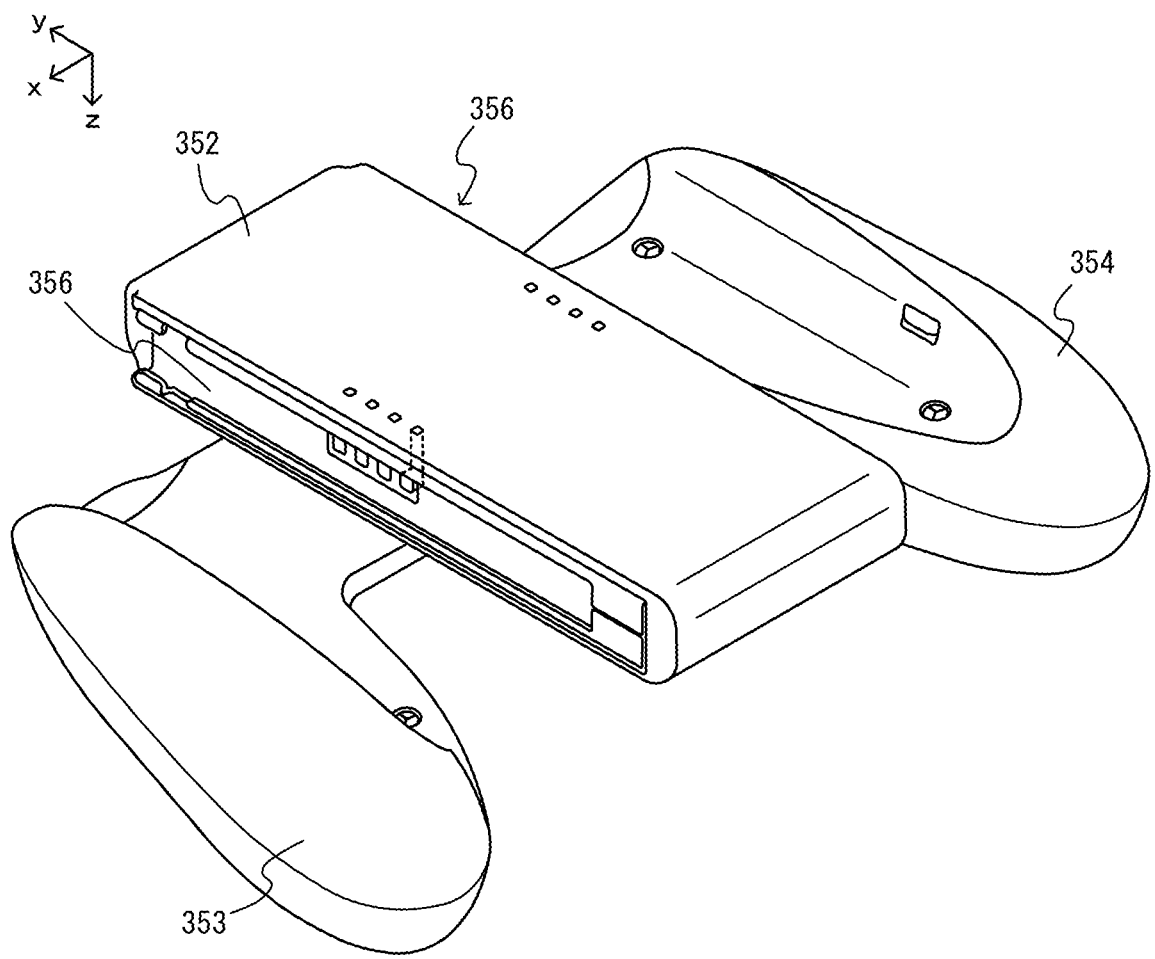
FIG. 8 is an example non-limiting diagram showing an accessory device to which the left controller 3 and the right controller 4 can be attached.
Figure 9:
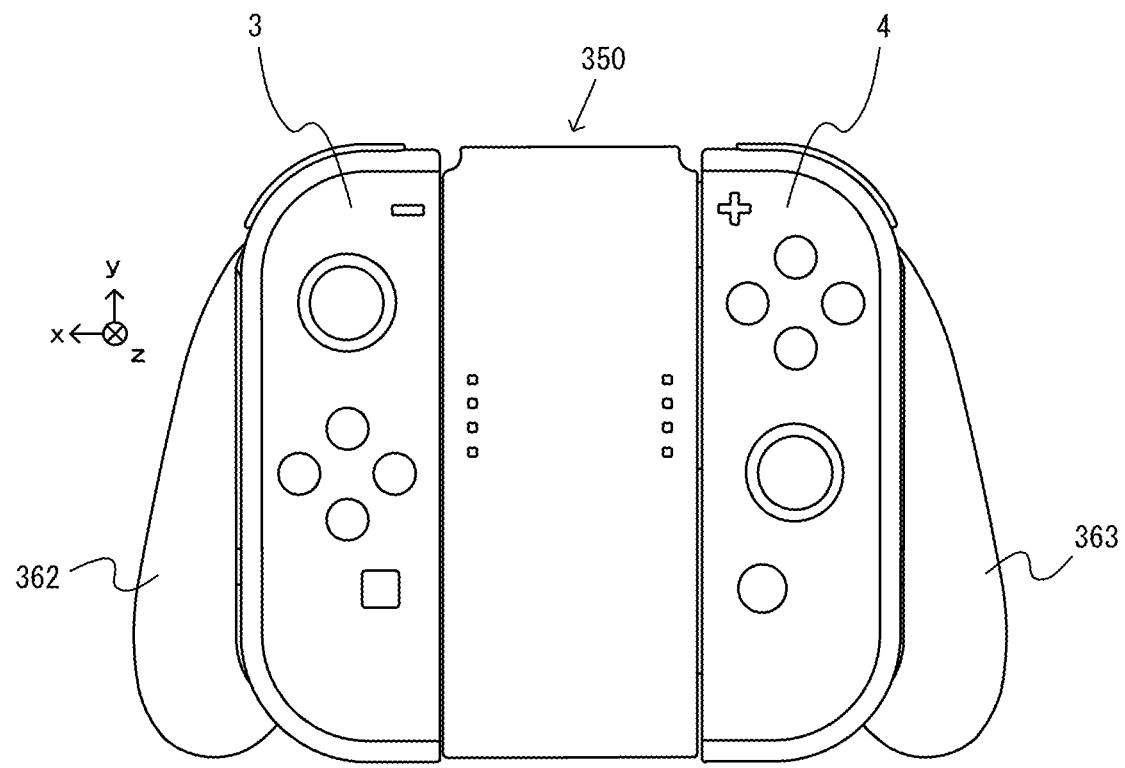
FIG. 9 is an example non-limiting diagram showing a state in which the left controller 3 and the right controller 4 are attached to the accessory device.

It should be noted that the controllers 3 and 4 detached from the main body apparatus 2 may be attached to an accessory device. FIG. 8 is an example non-limiting diagram showing an example of an accessory device to which the left controller 3 and the right controller 4 can be attached. FIG. 9 is an example non-limiting diagram showing an example of a state in which the left controller 3 and the right controller 4 are attached to the accessory device.

As shown in FIG. 8, the accessory device has a support portion 352, a left grip portion 353 that is to be held by the user using the left hand, and a right grip portion 354 which is to be held by the user using the right hand. Further, as shown in FIG. 8, a left rail member 356 that is to be slidably engaged with the slide portion provided on the right side surface of the left controller 3, is provided on a left side surface of the support portion 352. Similarly, a right rail member 356 that is to be engaged with the slide portion provided on the left side surface of the right controller 4, is provided on a right side surface of the support portion 352. The left rail member 356 allows the left controller 3 to slide in the negative direction of the y-axis of FIG. 8, so that the left controller 3 is fastened on the left side of the support portion 352 (see FIG. 9). Further, the right rail member 356 allows the right controller 4 to slide in the negative direction of the y-axis of FIG. 8, so that the right controller 4 is fastened on the right side of support portion 352 (see FIG. 9). Thus, by using the controllers 3 and 4 as attached to the accessory device, the user can feel as if the user operated a controller that is supposed to be held by both hands.

(Game Control Using Each Controller)

In this exemplary embodiment, the user plays a predetermined game using the information processing system 1. For example, in the game, the user moves a player character P that is displayed on the display 12 of the main body apparatus 2, in a game space, and causes the player character P to fight against a predetermined enemy character. It should be noted that, in this exemplary embodiment, the user can play the game alone, or together with one or more other users. When the user plays the game alone, the user causes their own player character P to move in the game space or fight against an enemy character (non-player character) that is controlled by the main body apparatus 2. When a plurality of users play the game, a plurality of main body apparatuses 2 communicate with each other (e.g., wireless communication, communication through a LAN, or communication through the Internet), and the users operate their own player characters to fight against each other.

In this exemplary embodiment, the user can perform game operations (e.g., operations for causing the player character P to move or fight against an enemy character, etc.) using the left controller 3 and the right controller 4 as attached to the main body apparatus 2. Further, the user can also perform game operations using the left controller 3 and the right controller 4 as detached from the main body apparatus 2.

Figure 10:
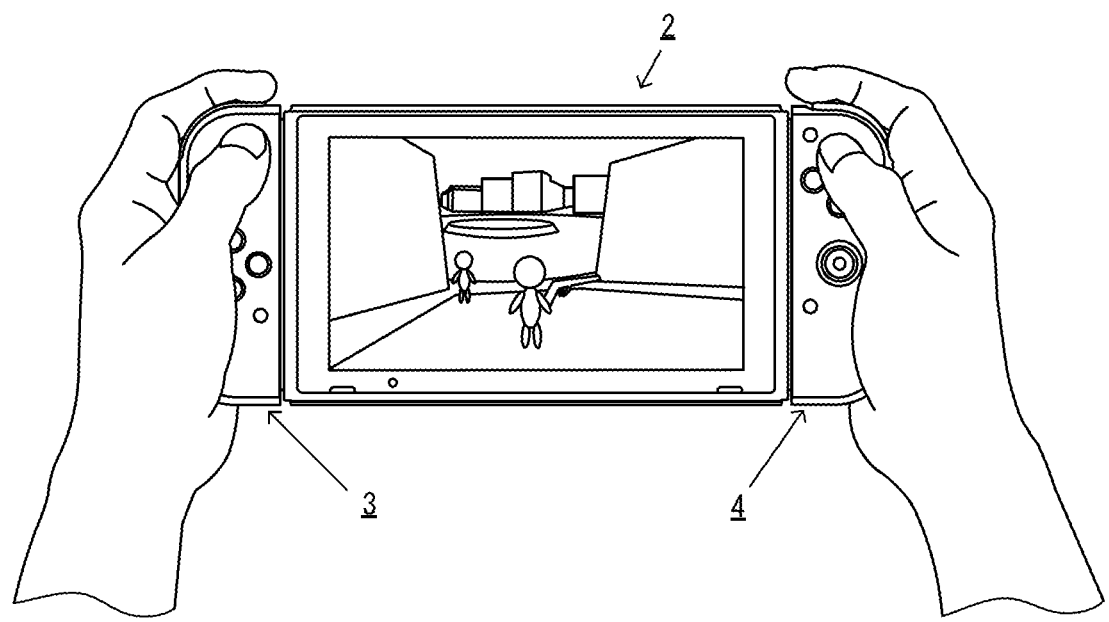
FIG. 10 is an example non-limiting diagram showing a situation where a game is played using the left controller 3 and the right controller 4 as attached to the main body apparatus 2.

FIG. 10 is an example non-limiting diagram showing an example of a situation where the game is played using the left controller 3 and the right controller 4 as attached to the main body apparatus 2 (this state is referred to as an "attached state"). As shown in FIG. 10, when the controllers 3 and 4 are both attached to the main body apparatus 2, the information processing system 1 can be used as a handheld device (e.g., a handheld game console).

In the attached state, the main body apparatus 2 communicates with each of the controllers 3 and 4 through wired communication (i.e., communication via terminals of the apparatuses connected to each other). That is, the main body apparatus 2 receives operation data from each of the controllers 3 and 4 as attached thereto, and performs game processing based on the received operation data.

It should be noted that, in another exemplary embodiment, in the attached state, the main body apparatus 2 may communicate with each of the controllers 3 and 4 through wireless communication. That is, in a situation where the left controller 3 and the right controller 4 are attached to the main body apparatus 2, the main body apparatus 2 may communicate with the left controller 3 wirelessly without using the terminals 17 and 42, and the main body apparatus 2 may communicate with the right controller 4 wirelessly without using the terminals 21 and 64.

In this exemplary embodiment, as shown in FIG. 10, a pair of the left controller 3 and the right controller 4 as attached to the main body apparatus 2 is referred to as a "handheld console controller 100." That is, the left controller 3 and the right controller 4 as unified with the main body apparatus 2 is referred to as a "handheld console controller 100." In this exemplary embodiment, the user can perform game operations using the left controller 3 and the right controller 4 as attached to the main body apparatus 2 as a single handheld console controller 100.

FIG. 11 is an example non-limiting diagram showing an example of a situation where the game is played using the left controller 3 and the right controller 4 as detached from the main body apparatus 2 (this state is referred to as a "detached state").

In the detached state, the main body apparatus 2 communicates with each of the left controller 3 and the right controller 4 through wireless communication. That is, the main body apparatus 2 receives operation data from the left controller 3 and the right controller 4 as wirelessly connected thereto (pairing has been established), and performs game processing based on the received operation data.

Although FIG. 11 shows a situation where the left controller 3 and the right controller 4 as attached to the above accessory device are used, the left controller 3 and the right controller 4 may also each be used without being attached to the accessory device. That is, the left controller 3 may be held using the left hand of the user, and the right controller 4 may be held using the right hand of the user.

Although, in the description that follows, a case where the game is played in the detached state is described, the same game can be similarly played in the attached state. Further, the left controller 3 and the right controller 4 are hereinafter collectively referred to as "controllers."

(Description of Game in this Exemplary Embodiment)

Next, the game of this exemplary embodiment will be specifically described. In the description that follows, it is assumed that four players play the game using their own main body apparatuses 2 and controllers. For example, it is assumed that a user A operates a player character PA, a user B operates a player character PB, a user C operates a player character PC, and a user D operates a player character PD. The game proceeds by the four main body apparatuses 2 communicating with each other. It should be noted that the number of players that is four is merely for illustrative purposes, and the game may be played by any suitable number of users.

FIG. 12 is an example non-limiting diagram showing an example of an image that is displayed on the display 12 of the main body apparatus 2 of the user A. As shown in FIG.

12, the display 12 displays the player character PA corresponding to the user A, the player character PB corresponding to the user B, and a reticle image X. In the game of this exemplary embodiment, each user operates their own player character so that the player character shoots another player character, for example. The reticle image X shows an aiming point that is displayed when the player character PA performs shooting. When the user A gives an instruction to shoot, shooting is performed toward a location in the game space that is indicated by the reticle image X. For example, when shooting is performed using a gun that fires bullets, bullets move toward the location in the game space that is indicated by the reticle image X. In the case of a gun that fires liquid, liquid moves toward the location in the game space that is indicated by the reticle image X.

The position of an aiming point indicated by the reticle image X is, for example, provided at approximately the center of a screen. For example, the aiming point is placed at a position where a straight line extending from the position of a virtual camera provided behind the player character PA in the game space in the line-of-sight direction of the virtual camera, intersects with a plane at a predetermined depth value in the game space, or a predetermined object. Therefore, the aiming point is placed at a position that substantially coincides with a gaze point of the virtual camera. It should be noted that the reticle image X may not always be being displayed on the screen. Even when the reticle image X is not being displayed, then if the user controls the direction of the virtual camera so that the gaze point of the virtual camera coincides with the aiming point, and therefore, an enemy character is located at the center of the screen, the user can launch an attack on the enemy character. Further, the aiming point does not necessarily need to coincide with the gaze point, and may be located a predetermined distance away from the gaze point.

Here, the line-of-sight direction of the virtual camera is controlled based on the orientation of a controller. Specifically, the orientation of the right controller 4 is calculated based on data obtained from the acceleration sensor and the angular velocity sensor of the right controller 4 (or the left controller 3, or both of the left controller 3 and the right controller 4). Based on the calculated orientation, the line-of-sight direction of the virtual camera is controlled. For example, the main body apparatus 2 sets a reference orientation of the controller, and detects a change in the orientation of the controller from the reference orientation. Further, the main body apparatus 2 changes the line-of-sight direction of the virtual camera, depending on the change in the orientation of the controller. For example, the reference orientation of the controller may be an orientation that is absolutely determined in the real space (e.g., an orientation such that the negative direction of the y-axis of FIG. 9 is parallel to the direction of gravity), or an orientation that is relatively determined (e.g., the orientation of the controller at the start of the game or at a time when the user performs a predetermined operation). Thus, the line-of-sight direction of the virtual camera can be controlled based on the orientation of the controller. Further, the aiming point can be controlled based on the orientation of the controller.

FIG. 13 is an example non-limiting diagram showing an example of a game image that is obtained after the left controller 3 and the right controller 4 are rotated about the y-axis of FIG. 12 by a predetermined angle from the state of FIG. 12.

As shown in FIG. 13, for example, when the user A rotates the controllers about the y-axis (the user A turns to face the left) from a state in which the controllers are held such that the negative direction of the y-axis is parallel to the direction of gravity (reference orientation) in the real space, the virtual camera provided in the game space is also turned to face the left, depending on the angle of the rotation. Further, for example, when the user A rotates the controllers about the x-axis of FIG. 13 (e.g., the back surfaces of the controllers are turned to face obliquely upward in the real space) in the real space, the virtual camera in the game space is also turned to face upward in the game space. That is, the virtual camera moves in the game space in association with a change in the orientation of the controllers in the real space.

In the state shown in FIG. 12, the player character PB is located to the left of the center of the screen. When the user A aims the left controller 3 and the right controller 4 to the left, the line-of-sight direction of the virtual camera is also turned to point the left, so that the player character PB is viewed at the center of the screen as shown in FIG. 13. At this time, if the user A presses down, for example, the ZR-button 61 of the right controller 4, a situation is displayed where the player character PA performs shooting, and an object, such as a bullet, liquid, or the like, is fired and moves toward the reticle image X displayed at the center of the screen. Further, if the fired object hits the player character PB, the physical strength of the player character PB is reduced. If the physical strength of the player character PB becomes zero, the player character PB falls down.

Further, a direction input device, such as the analog stick 52 of the right controller 4 or the like, may be used to change the line-of-sight direction of the virtual camera. In this case, for example, when the analog stick 52 of the right controller 4 is tilted to the right, the virtual camera is turned to face the right. When the analog stick 52 is tilted to the left, the virtual camera is turned to face the left. The operation of the virtual camera using the analog stick 52 may be performed together with the operation of the virtual camera based on a change in the orientation of the controller, or only one of these operations may be effective.

As can be seen from the foregoing, the aiming point moves in association with the line-of-sight direction of the virtual camera, and therefore, is also controlled based on a change in the orientation of a controller (based on data output from the acceleration sensor and the angular velocity sensor). Similarly, the aiming point is also controlled based on operations performed on the analog stick 52 of the right controller 4.

An image, such as those shown in FIGS. 12 and 13, that is generated based on a virtual camera provided behind a player character in the game space, and is displayed on a display, is hereinafter referred to as a "game image."

Each user causes their own player character to move in the game space and shoot an enemy character (an opponent player character in a fight) or other objects. A player who satisfies conditions for win within a time limit wins the game. For example, if all enemy characters fall down while a user's player character survives, that user wins the game. Alternatively, the game may be a competition in which a user having a higher predetermined score is more successful within a time limit. As shown in FIG. 12, the display 12 of the main body apparatus 2 of each user displays a game image of the game space as viewed from behind their own player character, and only a portion of the game space can be basically viewed. Further, in the game space, various other objects, such as walls, buildings, trees, and the like, that block a line of sight are provided, and therefore, each user cannot determine whether or not an enemy character or a friendly character is present behind these other objects, only by viewing a game image.

To address this, in the game of this exemplary embodiment, when a player presses down a predetermined button (e.g., the X-button 55 of the right controller 4), a map image that shows a wide range of the game space is displayed on the display 12.

Figure 14:
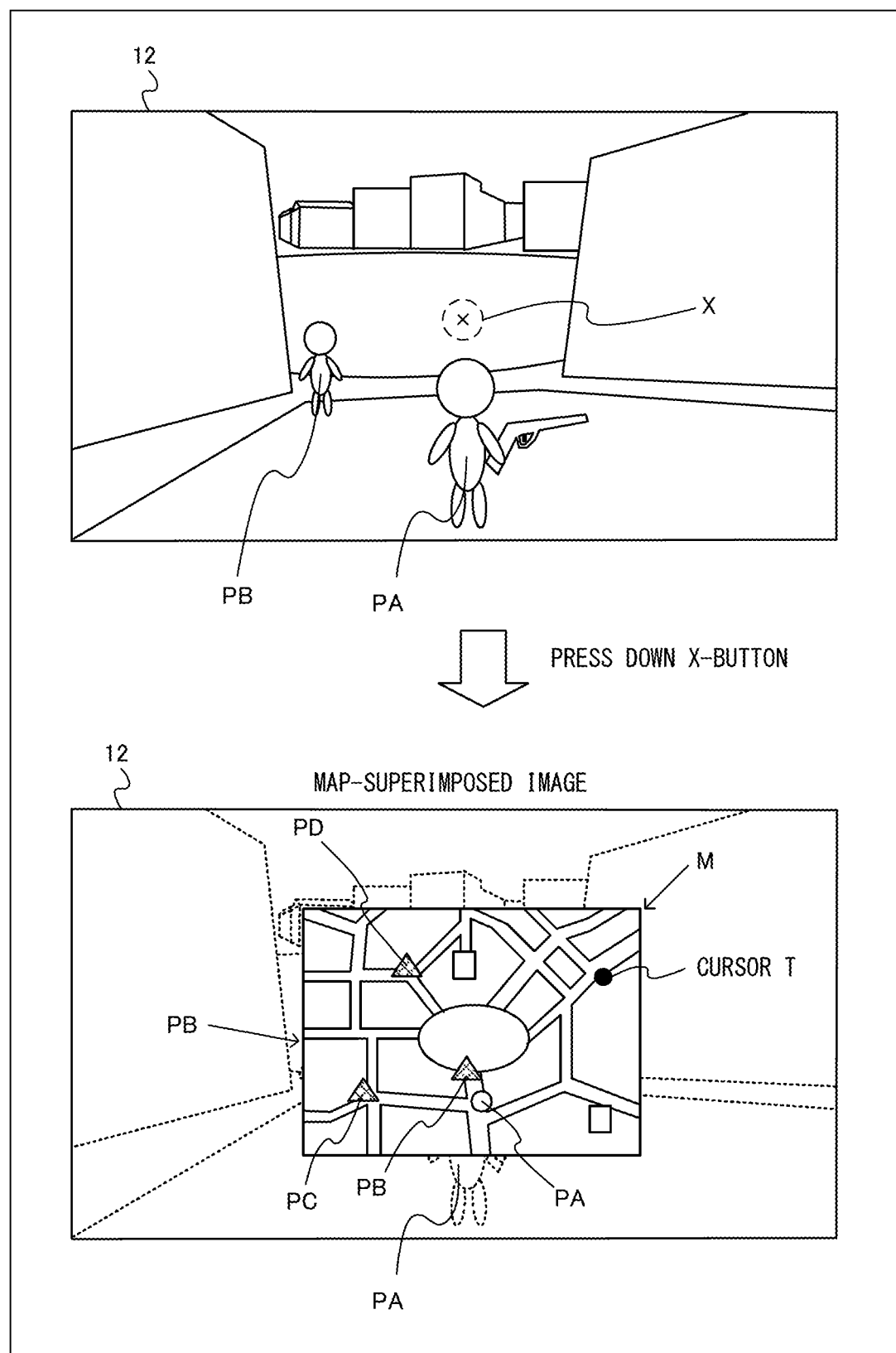
FIG. 14 is an example non-limiting diagram showing a map image that is displayed when the user A presses down an X-button.

FIG. 14 is an example non-limiting diagram showing an example of a map image that is displayed when the user A presses down the X-button 55. As shown in FIG. 14, when the player presses down the X-button 55 while a normal game image is being displayed, a map image M is displayed at the center of the display 12, and superimposed on a game image, i.e., a portion of the game image is covered by the map image M.

As shown in a lower portion of FIG. 14, the map image M is a bird's-eye view of the game space, i.e., an image of all or a portion of the game space as viewed from above. The map image M includes an image indicating the location of each player character. For example, an open-circular image indicating the location of the player character PA, and triangular images indicating the locations of the player characters PB to PD, are displayed on the map. As a result, the user A can easily know the location of each player character. In some games, all of the player characters PB to PD may be an enemy character, or some of the player characters PB to PD may be a friendly character. Here, only friendly characters may be displayed on the map while enemy characters may not be displayed. Alternatively, all characters may be displayed. Still alternatively, friendly characters, and enemy characters that satisfy predetermined conditions, may be displayed. Examples of the predetermined conditions for an enemy character include: the enemy character is being damaged; the enemy character is located within a predetermined range; the map image M is being displayed on the apparatus of a player who is controlling the enemy character; and the like.

Further, a cursor T is displayed in the map image M. When the cursor T is indicating a predetermined location on the map, then if the user A presses down a predetermined button (e.g., the A-button 53), the player character PA moves to the location indicated by the cursor T in the game space instantaneously or quickly. For example, when the user A moves the cursor T to the location of the player character PB and presses down the A-button 53 while the map image M is being displayed, the player character PA moves to the location of the player character PB instantaneously or quickly. It should be noted that a player character may be allowed to move to any location that is indicated by the cursor T, or may be allowed to move a location indicated by the cursor T only if that location is a predetermined location in the game space. Further, one player character may be allowed to move to the location of another player character only if the other player character is a friendly character. Further, in another example, instead of moving a player character, the cursor T may be operated so as to remotely perform a predetermined action on another player character selected.

While the map image M shown in the lower portion of FIG. 14 is being displayed and superimposed on a game image, the user A can perform shooting by pressing down the ZR-button 61 of the right controller 4, for example. Further, while the map image M is being displayed and superimposed on a game image, the user A can move the player character PA in the game space using the analog stick 32 of the left controller 3, for example. That is, while the map image M is being displayed and superimposed on a game image, the user can perform game operations in a manner similar to that which is performed when a normal game image is being displayed (the map image M is not being displayed or superimposed on a game image).

When each user presses down the X-button 55 of their own right controller 4, the map image M can be displayed on the display 12 of their own main body apparatus 2. Thus, the map image M is used to know a general situation, such as the locations of other player characters and the like. In addition, game operations can be normally performed while the map image M is being displayed, and therefore, a case where a player character is attacked by an enemy character without being controlled while the map image M is being viewed, can be reduced, and operations can be smoothly performed. Meanwhile, in this situation, a user for which the map image M is being displayed is advantageous over a user for which the map image M is not being displayed. For this reason, it is considered that each user plays the game while the map image M is always being displayed. This is, however, a play style different from that which is originally intended. This is because, in this exemplary embodiment, the game is supposed to be played while switching between the case where only a game image is being displayed and the case where the map image M is being additionally displayed.

Therefore, in this exemplary embodiment, in order to reduce, to some extent, the case where each user plays the game while always viewing the map image M, the map image M is displayed and superimposed in the vicinity of the center of a game image (an image captured from behind a player character). Since the map image M is displayed and superimposed at the center of a game image, all or a portion of the player character PA, and the aiming point image X, are hidden by the map image M as shown in the lower portion of FIG. 14. Further, while the map image M is being displayed, a game image is altered so that it is difficult for the user to view the game image. For example, while the map image M is being displayed, a blurred version of a normal game image is displayed on the display 12. It should be noted that, in the lower portion of FIG. 14, a game image displayed behind the map image M is indicated by a dotted line, which indicates that the game image is a blurred image. That is, while the map image M is being displayed, the display is inconvenient for the user trying to continue the game in this state although the user can perform operations. In another exemplary embodiment, in the case of a game in which the map image M can be always being displayed, the map image M may be displayed in a region, such as an end of the screen or the like, where the map image M is less likely to interfere with the user's operations, and a game image may be normally displayed.

Figure 15:
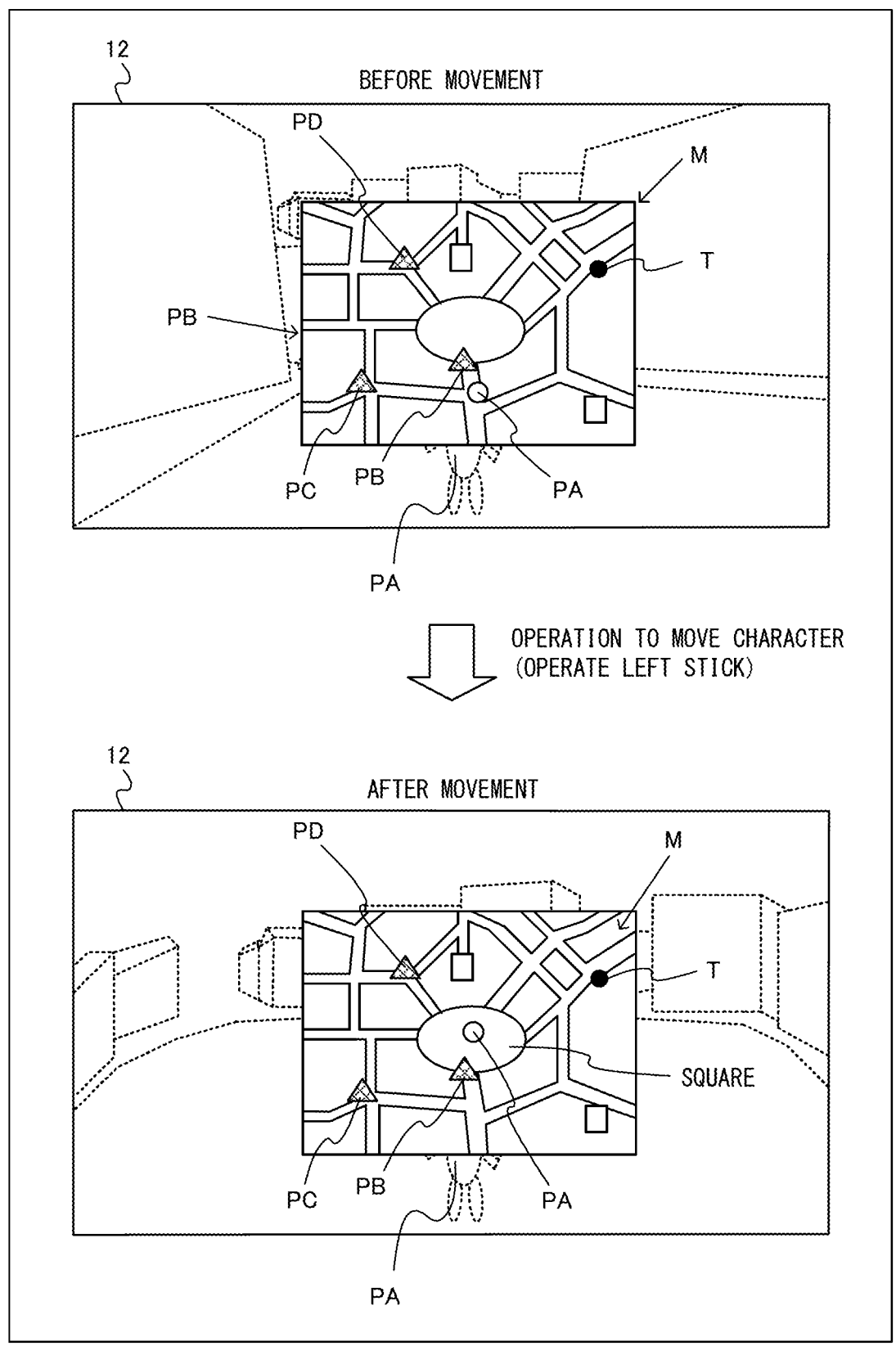
FIG. 15 is an example non-limiting diagram showing an image that is displayed on a display when a user has performed an operation to move a player character PA while a map image M is being displayed and superimposed on a game image.

FIG. 15 is an example non-limiting diagram showing an example of an image that is displayed on the display when the user performs an operation to move the player character PA while the map image M is being displayed and superimposed on a game image. An upper portion of FIG. 15 shows an image that is taken before the movement of the player character PA, and a lower portion of FIG. 15 shows an image that is taken after the movement of the player character PA.

When the image shown in the upper portion of FIG. 15 is being displayed on the display, then if the user performs an operation to move the player character PA using, for example, the analog stick 32 of the left controller 3, the player character PA moves in the game space. For example, when the user A tilts the analog stick 32 upward, the player character PA moves in the depth direction of the screen in the game space as shown in the lower portion of FIG. 15. The open-circular image indicating the location of the player character PA moves upward in the map image M in association with the movement of the player character PA. Further, the virtual camera provided behind the player character PA also moves in association with the movement of the player character PA, and therefore, the entire game image is changed. For example, the lower portion of FIG. 15 shows a situation where the player character PA has moved to a square in the game space, and the open-circular image indicating the location of the player character PA in the map image M is also located in the square. Further, as a game image, displayed is an image of the game space as viewed from behind the player character PA that is present in the square.

Figure 16:
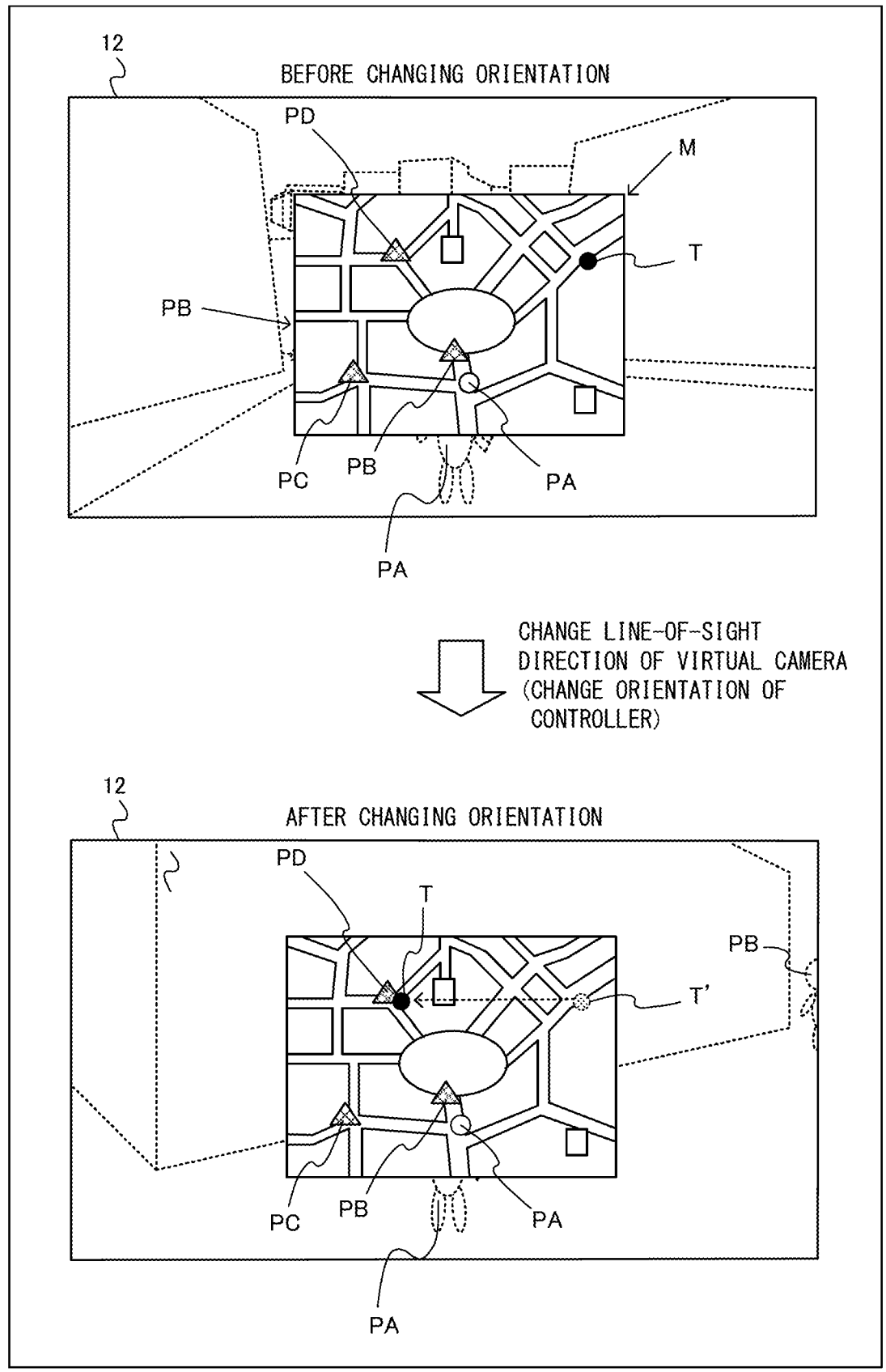
FIG. 16 is an example non-limiting diagram showing an image that is displayed when a user performs an operation to change the orientation of a controller while a map image M is being displayed and superimposed on a game image.

FIG. 16 is an example non-limiting diagram showing an example of an image that is displayed when the user performs an operation to change the orientation of a controller while the map image M is being displayed and superimposed on a game image. An upper portion of FIG. 16 shows an image that is taken before the user changes the orientation of a controller, and a lower portion of FIG. 16 shows an image that is taken after the user changes the orientation of a controller.

For example, when the user performs an operation to change the orientation of a controller while the image shown in the upper portion of FIG. 16 is being displayed on the display, the line-of-sight direction of the virtual camera is also changed, so that an image captured by the virtual camera having a changed orientation is displayed as a game image on the display, as described above with reference to FIG. 13. Further, the aiming point is also moved in association with the change in the line-of-sight direction of the virtual camera. Specifically, for example, the main body apparatus 2 detects a change in the orientation of the right controller 4 based on an acceleration and an angular velocity detected by the acceleration sensor and the angular velocity sensor of the right controller 4, and changes the line-of-sight direction of the virtual camera, depending on the change in the orientation. For example, when the user changes the orientation of a controller from the reference orientation so that the back surface of the controller turns to face the left, the virtual camera is also turned to face the left, so that a game image captured by the virtual camera facing the left is displayed on the display as shown in the lower portion of FIG. 16.

Further, as shown in the lower portion of FIG. 16, the cursor T displayed on the map image M is moved on the map image M, depending on a change in the orientation of a controller. In the lower portion of FIG. 16, a dashed-line circle indicates a cursor T' that is the cursor T before being moved, and a closed circle indicates the cursor T after being moved. For example, when the user changes the orientation of a controller from the reference orientation so that the back surface of the controller is turned to face the left, the cursor T on the map image M is also moved to the left.

That is, when the map image M is being displayed and superimposed on a game image, operations performed on the cursor T on the map image M are effective. In this case, the line-of-sight direction of the virtual camera (and the aiming point) in the game space are controlled based on data from the acceleration sensor and the angular velocity sensor of a controller (e.g., the right controller 4), and at the same time, the location of the cursor T displayed on the map image M is also controlled based on the same data. It should be noted that when the map image M is not being displayed or superimposed on a game image, the line-of-sight direction of the virtual camera in the game space is controlled based on data from the acceleration sensor and the angular velocity sensor of a controller (e.g., the right controller 4), and the cursor T is not displayed, and therefore, is not controlled.

Further, for example, in the state shown in the lower portion of FIG. 16, when the user presses down the ZR-button 61 of the right controller 4, shooting is performed toward the location of the aiming point (the gaze point of the virtual camera) hidden by the map image M (e.g., a bullet is fired toward the aiming point). Further, for example, in the state shown in the lower portion of FIG. 16, when the user presses down the A-button 53 of the right controller 4, the player character PA moves to the location of the cursor T. It should be noted that, in the state shown in the lower portion of FIG. 16, when the A-button 53 is pressed down, the player character PA moves to the location of the cursor T, and the map image M disappears, and a normal game image is displayed again. Further, if the cursor T is not located at a predetermined position (e.g., the location of another player character, or other predetermined positions) on the map image M, even when the A-button 53 is pressed down, the player character PA does not move to the location in the game space that is indicated by the cursor T.

Next, an image that is displayed on the display of one user when a map image M is being displayed on the display of another user, will be described.

Figure 17:
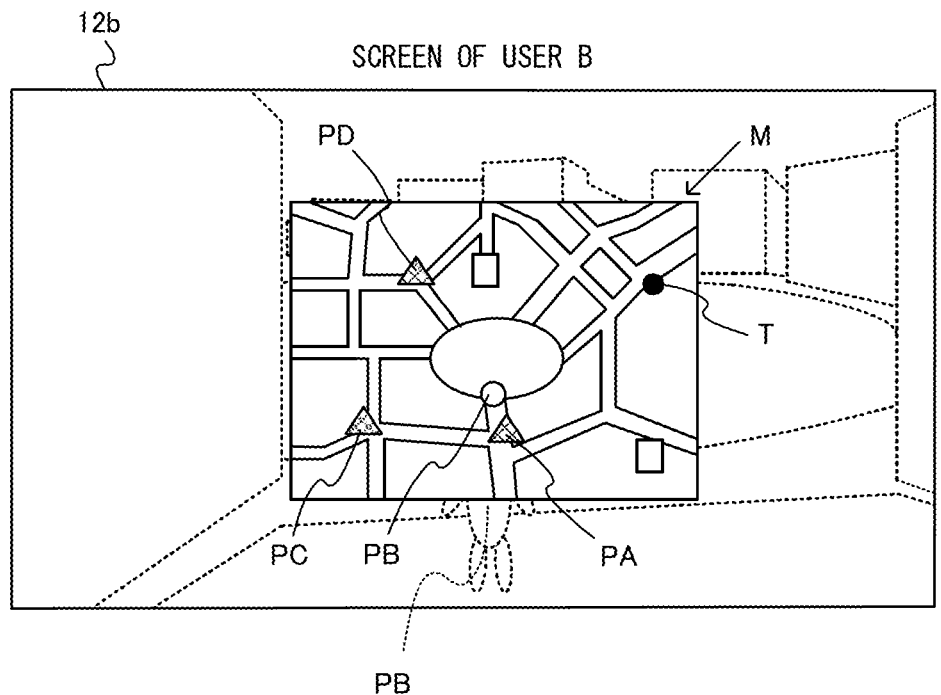
FIG. 17 is an example non-limiting diagram showing an image that is displayed on a display 12b of a main body apparatus 2 of a user B when a map image M is being displayed by the user B.
Figure 18:
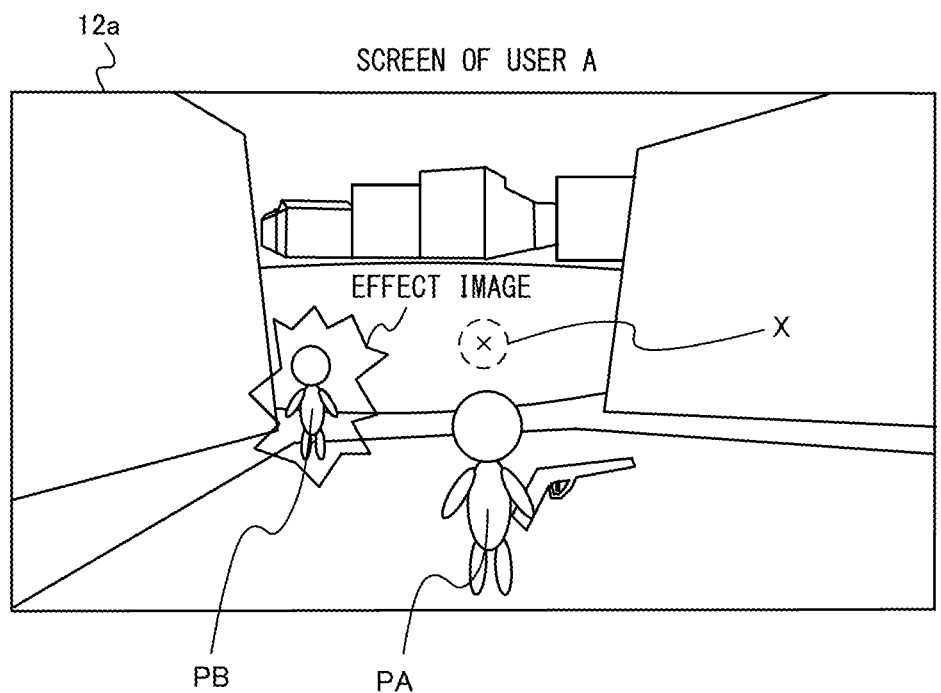
FIG. 18 is an example non-limiting diagram showing an image that is displayed on the display 12a of the main body apparatus 2 of the user A when the image of FIG. 17 is being displayed on the display 12b of the main body apparatus 2b of the user B.

FIG. 17 is an example non-limiting diagram showing an example of an image that is displayed on the display 12*b* of the main body apparatus 2*b* of the user B when a map image M is being displayed by the user B. FIG. 18 is an example non-limiting diagram showing an example of an image that is displayed on the display 12*a* of the main body apparatus 2*a* of the user A when the image of FIG. 17 is being displayed on the display 12*b* of the main body apparatus 2*b* of the user B.

As shown in FIG. 17, for example, when the user B presses down the X-button 55 of a controller, the map image M is displayed as in the case of the lower portion of FIG. 14. Specifically, the map image M is displayed and superimposed on a game image of the game space as viewed from a virtual camera provided behind the player character PB corresponding to the user B. In the map image M, triangular images indicating the locations of the player characters PA, PC, and PD are displayed, and an open-circular image indicating the location of the player character PB is displayed.

When the image of FIG. 17 is being displayed on the display 12*b* of the main body apparatus 2*b* of the user B, the image of FIG. 18 is displayed on the display 12*a* of the main body apparatus 2*a* of the user A. Specifically, as shown in FIG. 18, an effect image is displayed around the player character PB corresponding to the user B, who is viewing the map image M. This effect image indicates that the user B is viewing the map image M (i.e., the map image M is being displayed on the display 12*b* of the main body apparatus 2*b* of the user B). When the user B is not viewing the map image M (i.e., the map image M is not being displayed on the display 12*b* of the main body apparatus 2*b* of the user B), this effect image is not displayed.

The display of an effect image around the player character PB enables the user A to know that the user B is playing the game while viewing the map image M. This is true for the other users C and D. That is, when the player character PB is present within the image capture range of a virtual camera provided behind the player character PC corresponding to the user C, the player character PB and an effect image are displayed on the display 12*c* of the main body apparatus 2*c* of the user C. Further, when the player character PB is present within the image capture range of a virtual camera provided behind the player character PD corresponding to the user D, the player character PB and an effect image are displayed on the display 12d of the main body apparatus 2d of the user D.

Here, for example, when the player character PB is present within the image capture range of the virtual camera provided behind the player character PA, and, for example, a wall object is present between the virtual camera and the player character PB, the player character PB is hidden by the wall object.

Figure 19:
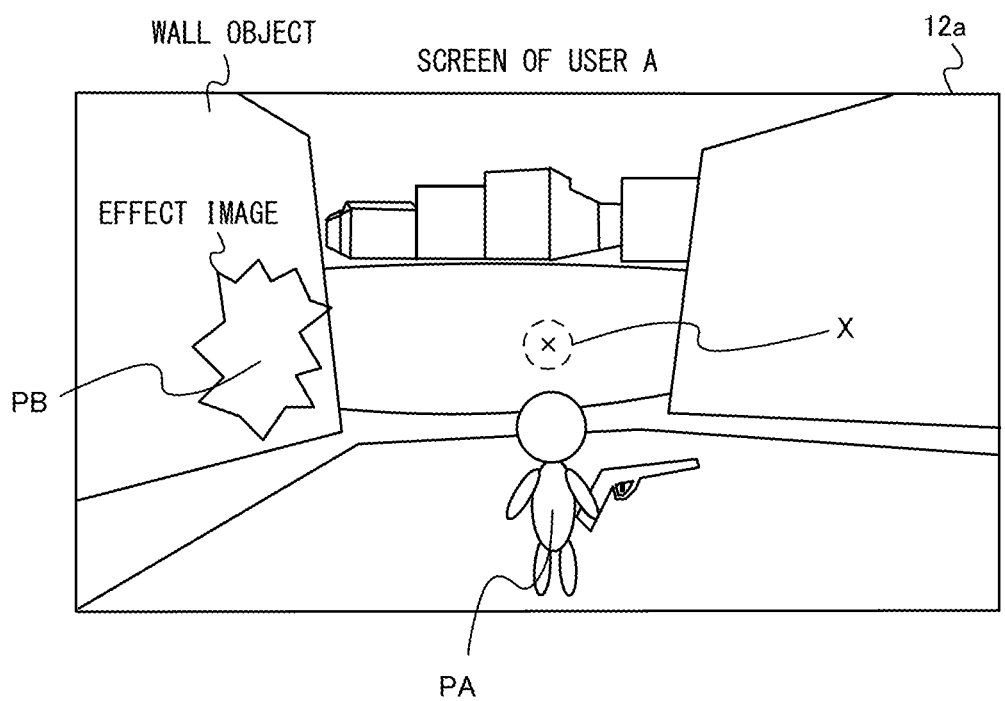
FIG. 19 is an example non-limiting diagram showing a game image captured by a virtual camera provided behind the player character PA in a case where a wall object is present between the virtual camera and the player character PB.

FIG. 19 is an example non-limiting diagram showing an example of a game image captured by a virtual camera provided behind the player character PA in a case where a wall object is present between the virtual camera and the player character PB.

As shown in FIG. 19, the player character PB is present within a range of the game space that can be captured by the virtual camera provided behind the player character PA (i.e., a range of the game space that is included in the angle of view of the virtual camera no matter whether any other object that blocks the line of sight is present between the player character PB and the virtual camera). However, the wall object is present between the player character PB and the virtual camera, and therefore, the player character PB cannot be viewed from the virtual camera. However, when an effect image is being displayed around the player character PB (i.e., a map image is being displayed by the user B), this effect image is viewed from the virtual camera through the wall object. That is, of the player character PB and the effect image, the effect image is transmitted through the wall object, and is captured by the virtual camera. Therefore, as shown in FIG. 19, only the effect image is displayed on the display 12a of the user A. This effect image enables the user A to recognize that the player character PB is hiding behind the wall object.

Meanwhile, when the map image M is not being displayed on the screen of the user B, the effect image is not displayed around the player character PB, and therefore, the user A cannot recognize that the player character PB is hiding behind the wall object.

Thus, in this exemplary embodiment, an effect image is displayed for a player character of a user who is viewing a map image M (a user whose screen is displaying a map image M), and therefore, another user can know that that user is viewing the map image M. Therefore, the situation where a user who plays while keeping a map image M displayed is predominantly advantageous, can be prevented or reduced.

As described above, in this exemplary embodiment, a user can operate a player character in a normal game image using a controller, control a virtual camera and the position of an aiming point by changing the orientation of the controller, and shoot toward the position of the aiming point by pressing down, for example, the ZR-button 61 of the controller. Further, when the user presses down, for example, the X-button 55 of the controller, the map image M is displayed and superimposed on the game image, and the user is allowed to operate the cursor T. The user can control the virtual camera and the position of the aiming point, and at the same time, control the position of the cursor T, by changing the orientation of the controller when the map image M is being displayed. Further, when the map image is being displayed, the user can shoot toward the position of the aiming point by pressing down the ZR-button 61 of the controller, and can move the player character to the position of the cursor T by pressing down the A-button 53. Therefore, when the map image M is being displayed, the two control objects can be controlled by the same operation, and meanwhile, the user decides to perform different actions by different operations, and therefore, only one operation can be performed without a trouble.

(Operation Data Output from Controller)

Figure 20:
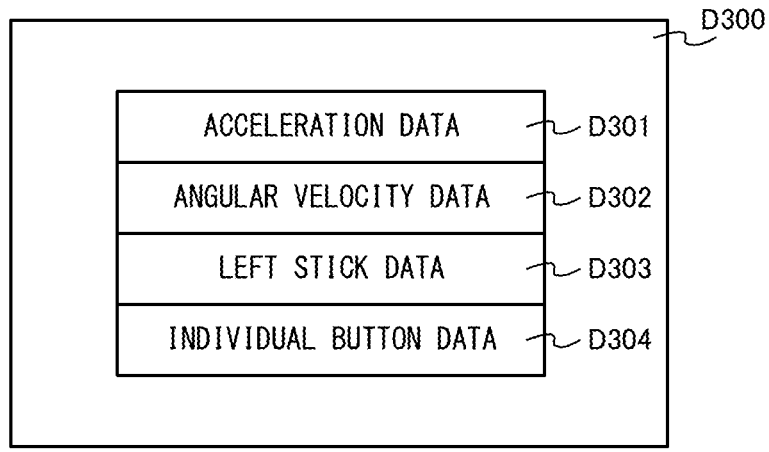
FIG. 20 is an example non-limiting diagram showing operation data output from the left controller 3.
Figure 21:
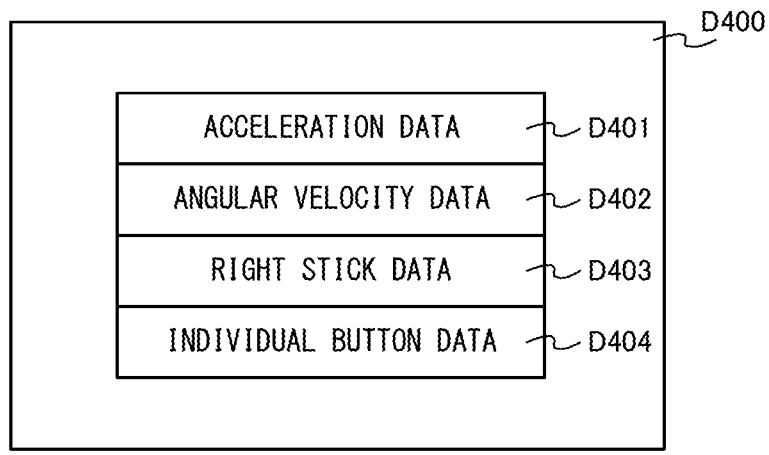
FIG. 21 is an example non-limiting diagram showing operation data output from the right controller 4.

Next, operation data output from each controller will be described. FIG. 20 is an example non-limiting diagram showing an example of operation data output from the left controller 3. FIG. 21 is an example non-limiting diagram showing an example of operation data output from the right controller 4.

As shown in FIG. 20, operation data D300 output from the left controller 3 includes acceleration data D301, angular velocity data D302, left stick data D303, and individual button data D304. The operation data D300 of FIG. 20 is output from the left controller 3 to the main body apparatus 2 at predetermined time intervals (e.g., intervals of $1/200$ sec).

The acceleration data D301 indicates a value of an acceleration detected by the acceleration sensor 104. The angular velocity data D302 indicates a value of an angular velocity detected by the angular velocity sensor 105.

The left stick data D303, which is related to an operation performed on the analog stick 32, includes data indicating a direction corresponding to the tilt direction of the stick member, and data indicating the tilt amount of the stick member. Further, as described above, the analog stick 32 is an input section that can provide an input by pressing down the stick member. The left stick data D303 also includes data indicating whether or not a press input has been performed on the analog stick 32.

The individual button data D304 includes data (data indicating "on" or "off") indicating whether or not an operation has been performed on each button of the left controller 3. For example, the individual button data D304 includes data indicating whether or not the operation buttons 33 to 36 have been pressed down, data indicating whether or not the record button 37 has been pressed down, data indicating whether or not the first L-button 38 has been pressed down, data indicating whether or not the ZL-button 39 has been pressed down, and data indicating whether or not the "−" button 47 has been pressed down.

Further, as shown in FIG. 21, operation data D400 output from the right controller 4 includes acceleration data D401, angular velocity data D402, right stick data D403, and individual button data D404. The operation data D400 of FIG. 21 is output from the right controller 4 to the main body apparatus 2 at predetermined time intervals (e.g., intervals of $1/200$ sec).

The acceleration data D401 indicates a value of an acceleration detected by the acceleration sensor 114. The angular velocity data D402 indicates a value of an angular velocity detected by the angular velocity sensor 115.

The right stick data D403, which is related to an operation performed on the analog stick 52, includes data indicating a direction corresponding to the tilt direction of the stick member, and data indicating the tilt amount of the stick member. Further, as described above, the analog stick 52 is an input section that can provide an input by pressing down the stick member. The right stick data D403 also includes data indicating whether or not a press input has been performed on the analog stick 52.

The individual button data D404 includes data (data indicating "on" or "off") indicating whether or not an operation has been performed on each button of the right controller 4. For example, the individual button data D404 includes data indicating whether or not the operation buttons 53 to 56 have been pressed down, data indicating whether or not the home button 58 has been pressed down, data indicating whether or not the first R-button 60 has been pressed down, data indicating whether or not the ZR-button 61 has been pressed down, and data indicating whether or not the "+" button 57 has been pressed down.

The main body apparatus 2 receives the operation data of FIGS. 20 and 21, and performs game processing. The main body apparatus 2 stores various items of data for performing game processing in addition to the operation data received from the controllers.

(Data Stored in Main Body Apparatus)

Figure 22:
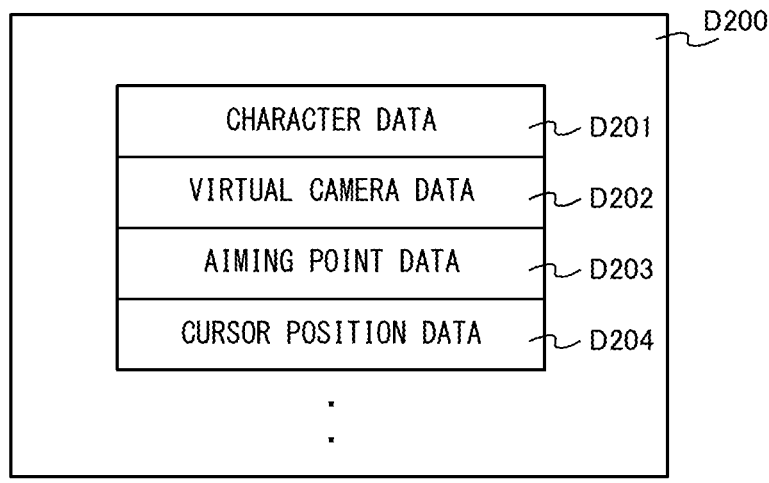
FIG. 22 is an example non-limiting diagram showing game data stored in a DRAM 85 provided in the main body apparatus 2.

FIG. 22 is an example non-limiting diagram showing an example of game data stored in a DRAM 85 provided in the main body apparatus 2. As shown in FIG. 22, the main body apparatus 2 stores, as game data D200, character data D201, virtual camera data D202, aiming point data D203, and cursor position data D204. It should be noted that, in addition to the data of FIG. 22, the main body apparatus 2 stores various items of data (data related to other objects in the game space, image data, audio data, etc.) required for game processing.

The character data D201 indicates the position, orientation, physical strength, and the like of each player character. For example, when four users play the game, data related to a player character corresponding to each user is stored as the character data D201. Further, the character data D201 includes data indicating whether or not a map image M is being displayed by each user (a map display flag described below). For example, when a map image M is being displayed by the user A, data indicating that the map image M is being displayed by the user A is stored. Further, when a map image M is being displayed by the user B, data indicating that the map image M is being displayed by the user B is stored.

The virtual camera data D202 indicates the location, orientation (line-of-sight direction), and gaze point of each virtual camera provided in the game space. When four users play the game, four virtual cameras are provided in the game space behind the respective player characters. The virtual camera data D202 includes information about the virtual camera provided behind each player character.

The aiming point data D203 indicates the position of an aiming point provided for each player character. Specifically, the position of each aiming point is moved in association with the gaze point of the corresponding virtual camera.

The cursor position data D204 indicates the position of the cursor T that is displayed on the map image M when the map image M is being displayed.

(Details of Process by Main Body Apparatus)

Figure 23:
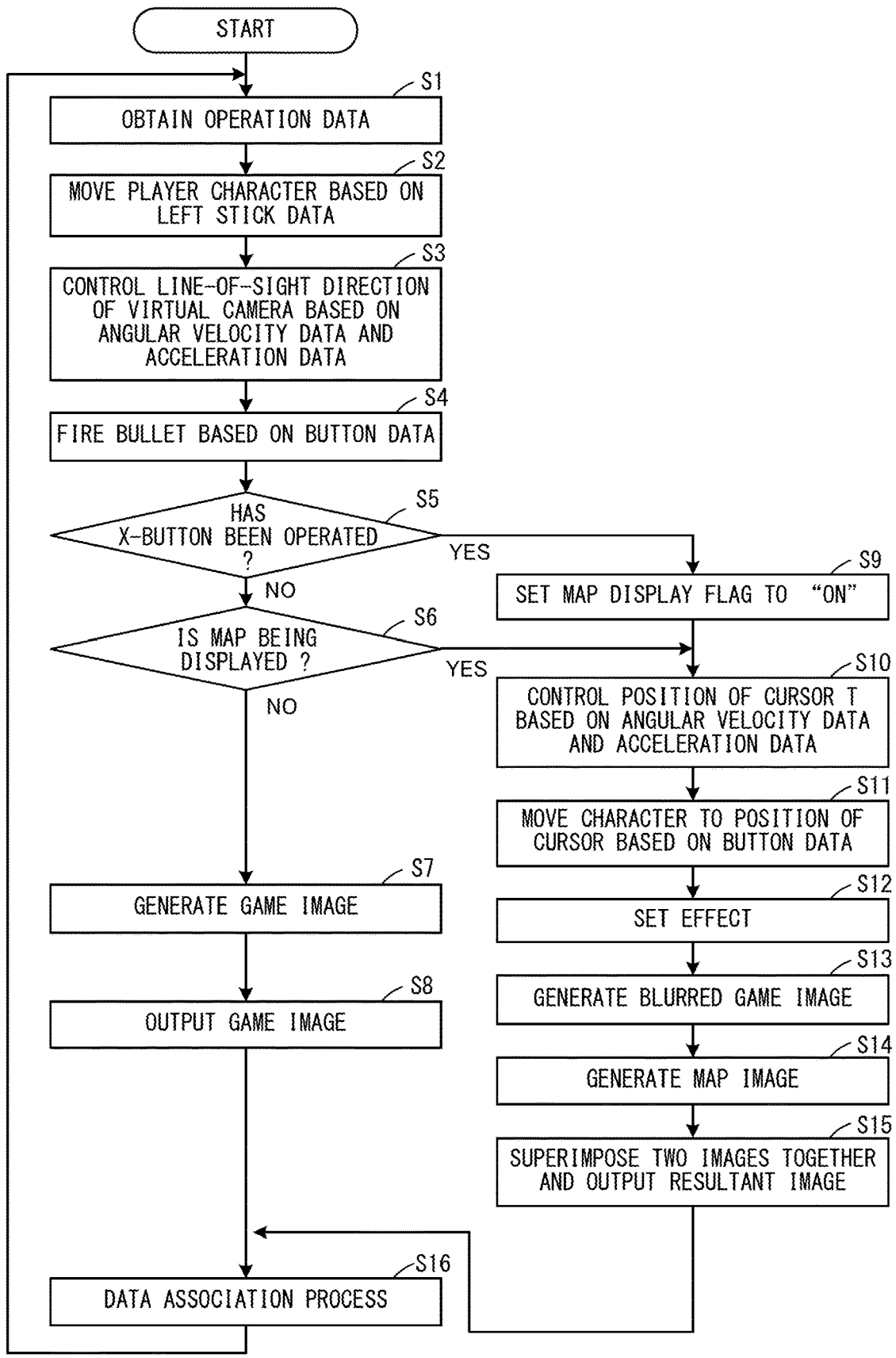
FIG. 23 is an example non-limiting flowchart showing a process performed in the main body apparatus 2.

Next, a process performed in the main body apparatus 2 will be described in detail. FIG. 23 is an example non-limiting flowchart showing an example of the process performed in the main body apparatus 2. The process of FIG. 23 is performed by the CPU 81 of the main body apparatus 2 executing a predetermined information processing program (e.g., a game program). It should be noted that the CPU 81 repeatedly performs steps S1 to S16 at predetermined time intervals (e.g., intervals of 1/60 sec). Further, in the description that follows, the process performed in the main body apparatus 2 of the user A, who operates the player character PA, is mainly described.

As shown in FIG. 23, the CPU 81 initially obtains operation data from a controller (step S1). Here, the CPU 81 obtains the operation data of FIG. 20 output from the left controller 3, and the operation data of FIG. 21 output from the right controller 4.

Next, the CPU 81 moves the player character PA in the game space based on the left stick data obtained in step S1 (step S2). Specifically, the CPU 81 moves the player character PA in a direction in the game space corresponding to the tilt direction of the analog stick 32, by a distance corresponding to the tilt amount of the analog stick 32, based on the left stick data D303. Further, when the player character PA is moved in the game space, the CPU 81 similarly moves the virtual camera provided behind the player character PA. The location of the player character PA after being moved is stored as the location of the player character PA in the character data D201 in the DRAM 85. Further, the position of the virtual camera after being moved is stored as the virtual camera data D202 in the DRAM 85. It should be noted that the result of the process thus performed is transmitted to other main body apparatuses 2 in a data association process of step S16 described below.

Next, the CPU 81 controls the line-of-sight direction of the virtual camera based on angular velocity data and acceleration data (step S3). Specifically, the CPU 81 calculates the orientation of the right controller 4 based on the acceleration data D401 and the angular velocity data D402 from the right controller 4, and calculates how much the calculated orientation of the right controller 4 is different from the reference orientation. Thereafter, the line-of-sight direction of the virtual camera provided behind the player character PA is changed, depending on the change in the orientation of the right controller 4.

It should be noted that, in step S3, the control of the line-of-sight direction of the virtual camera by the CPU 81 is also based on the right stick data D403.

Following step S3, the CPU 81 causes a bullet to be fired, based on individual button data, for example (step S4). Specifically, for example, the CPU 81 determines whether or not the ZR-button 61 has been pressed down, based on the button data D304 and D404 obtained in step S1. If the CPU 81 determines that the ZR-button 61 has been pressed down, the CPU 81 causes a bullet to be fired from the location of the player character PA toward the gaze point of the virtual camera. It should be noted that the result of this process is also transmitted to other main body apparatuses 2 in the data association process of step S16 described below.

Following step S4, the CPU 81 determines whether or not the X-button has been operated, based on the individual button data D304 and D404 obtained in step S1 (step S5).

If the CPU 81 does not determine that the X-button has been operated (step S5: NO), the CPU 81 determines whether or not the map image M is being displayed (step S6). The DRAM 85 of the main body apparatus 2 stores the map display flag indicating whether or not the map image M is being displayed. The CPU 81 determines whether or not the map image M is being displayed on the display 12, by checking the map display flag.

If the CPU 81 does not determine that the map image M is being displayed (step S6: NO), the CPU 81 generates a game image (step S7). Specifically, the CPU 81 generates a game image by capturing an image of the game space using the virtual camera provided behind the player character PA. Here, when a map image M is being displayed on the display 12 of another user (the map display flag is set to "on" in the main body apparatus 2 of the other user), an effect image is displayed around a player character corresponding to the other user. For example, when a map image M is being displayed on the display 12 of the main body apparatus 2 of the user B, an effect image is displayed around the player character PB.

Following step S7, the CPU 81 outputs the game image generated in step S7 to the display 12 (step S8).

Meanwhile, if the CPU 81 determines that the X-button has been operated (step S5: YES), the CPU 81 sets the map display flag to "on" (step S9). It should be noted that when the X-button has been operated while the map image M is being displayed, the CPU 81 sets the map display flag to "off," control proceeds to step S7. It should be noted that the map display flag thus set is also transmitted to other main body apparatuses 2 in the data association process of step S16 described below. That is, the main body apparatus 2 notifies other main body apparatuses 2 on which the same game is being played that the map image is being displayed on itself. As a result, the main body apparatus 2 can notify other main body apparatuses 2 whether or not the map image M is being displayed.

If step S9 has been executed or if the CPU 81 determines that the map image M is being displayed (step S6: YES), the CPU 81 controls the position of the cursor T based on the acceleration data D401 and the angular velocity data D402 obtained in step S1 (step S10). Specifically, the CPU 81 calculates the orientation of the right controller 4 based on the acceleration data D401 and the angular velocity data D402, and calculates how much the calculated orientation of the right controller 4 is different from the reference orientation. Thereafter, based on the calculated change in the orientation, the CPU 81 controls the position of the cursor T on the map image M.

Next, the CPU 81 moves the player character PA to the position of the cursor T on the map image M, based on the individual button data D404 (step S11). Specifically, based on the individual button data D404 obtained in step S1, the CPU 81 determines whether or not the A-button 53 has been pressed down. If the CPU 81 determines that the A-button 53 has been pressed down, the CPU 81 determines whether or not the position of the cursor T is any predetermined location on the map image M. Specifically, the CPU 81 determines whether or not another player character is present at the position of the cursor T. If the determination result is positive, the CPU 81 moves the player character PA to the position of the cursor T. The CPU 81 executes the next step S12.

In step S12, the CPU 81 sets an effect for the player character PA (step S12). As a result, an effect image can be displayed around the player character PA on the screens of other users.

Following step S12, the CPU 81 generates a game image of the game space captured by the virtual camera (step S13). Here, the CPU 81 performs a process of blurring the game image. Specifically, the CPU 81 captures an image of the game space using the virtual camera provided behind the player character PA, and blurs the captured image, to generate a game image.

Next, the CPU 81 generates a map image (step S14). Specifically, the CPU 81 generates the map image M that is an image of a map of the game space as viewed from above, on which an image indicating the location of each player character is superimposed.

Following step S14, the CPU 81 superimposes the map image generated in step S14 on the game image generated in step S13, and outputs the resultant image to the display 12 (step S15). Specifically, the CPU 81 superimposes the map image generated in step S14 at the center of the game image generated in step S13 to generate a superimposition image. Thereafter, the CPU 81 outputs the generated superimposition image to the display 12.

Following step S8 or step S15, the CPU 81 performs the data association process with respect to other main body apparatuses 2 (step S16). Here, the CPU 81 transmits the result of each step to other main body apparatuses 2 (other main body apparatuses that are participating in the fighting game), and receives similar data from the other main body apparatuses 2. For example, the CPU 81 transmits the value of the map display flag set in step S9 to the other main body apparatuses 2. Further, the CPU 81 receives the values of the map display flags set in the other main body apparatuses from the other main body apparatuses. That is, the main body apparatus 2 notifies the other main body apparatuses 2 that the map image M is being displayed on itself, and is notified of similar information by the other main body apparatuses 2. Further, the CPU 81 transmits information indicating the location and orientation of a character, and information indicating whether or not shooting has been performed, to the other main body apparatuses 2, and receives similar information from the other main body apparatuses 2. As a result, information indicating the location and action of a player character operated by each user, and information indicating whether or not a map image M is being displayed on the main body apparatus 2 of each user, are exchanged between the main body apparatuses 2.

Following step S16, the CPU 81 executes step S1 again.

It should be noted that the above process is merely for illustrative purposes. Alternatively, for example, some or all of the steps may be performed in other orders, other steps may be added, or some of the steps may be removed.

As described above, in this exemplary embodiment, when the X-button of a controller is pressed down, a map image (second image) is displayed and superimposed on a game image (first image). When the map image is being displayed and superimposed on the game image, a virtual camera and an aiming point (first control object) are controlled based on data from an acceleration sensor and an angular velocity sensor (inertial sensor) provided in the controller, and at the same time, a cursor (second control object) on the map image is controlled. Further, when a predetermined button (e.g., the ZR-button) of the controller is pressed down, a bullet is fired from a player character to the aiming point. When another button (e.g., the A-button) of the controller is pressed down, the player character moves to the position of a cursor.

As a result, the two different control objects can be simultaneously controlled on a single screen. That is, a game image and a map image are displayed on a single screen, and a virtual camera and an aiming point can be controlled by changing the orientation of a controller, and a game image based on the controlled virtual camera can be displayed. At the same time, a cursor on the map image can be controlled by changing the orientation of the controller. Further, while the two control objects are controlled on a single screen, a process based on each control object can be performed by operating a different button. Specifically, the aiming point and the cursor are simultaneously controlled by changing the orientation of the controller, and a bullet is fired toward the aiming point by pressing down, for example, the ZR-button, and a player character can be moved to the position of the cursor by pressing down, for example, the A-button.

Further, in this exemplary embodiment, not only simply displayed is a game image captured by a virtual camera, but also a map image can be displayed in accordance with a user's instruction. Therefore, the user can know a situation in the entire game space, and therefore, the convenience of the user is improved in the game. Further, in this exemplary embodiment, a map image is superimposed on a game image, the user can know a situation in the entire game space on a single screen, and at the same time, perform game operations on the game image.

Further, in this exemplary embodiment, by displaying a map image, one user can know the location of another user, and therefore, is advantageous over the other user. However, in this exemplary embodiment, the map image is displayed and superimposed on a game image, so that a portion of the game image is hidden. Further, when the map image is being displayed, the game image is blurred. Therefore, one user who is keeping the map image displayed can know the location of another user, but cannot accurately know the position of the aiming point, and therefore, when a player character of the other user is present in a region where the map image is being displayed, the user cannot view the character. That is, the visibility of a game image is reduced so that the advantage of displaying a map image is canceled. As a result, in this exemplary embodiment, a user can be prevented from playing the game while keeping a map image displayed. Thus, a user plays the game in a normal game image without a map image being displayed, and a map image can be displayed when necessary.

(Variations)

This exemplary embodiment has been described above. Other exemplary embodiments may be provided as follows.

For example, in this exemplary embodiment, the orientation of a controller is calculated based on data from inertial sensors (an acceleration sensor and an angular velocity sensor) provided in a controller, and controls the line-of-sight direction of a virtual camera and an aiming point based on the calculated orientation. In another exemplary embodiment, the line-of-sight direction of a virtual camera and the position of an aiming point may be controlled based on an operation performed on a predetermined button or an analog stick of a controller, instead of the orientation of a controller. In this case, when a map image is being displayed on a game image, the line-of-sight direction of a virtual camera and the like may be controlled, and at the same time, a cursor on the map image may be controlled, in accordance with an operation performed on a predetermined button or an analog stick of a controller. That is, when a map image is being displayed on a game image, a virtual camera and the like may be controlled, and at the same time, a cursor may be controlled, based on operation data (data output from an inertial sensor, data related to pressing of a button, data related to an operation performed on an analog stick, etc.) from a controller. Further, a virtual camera and the like may be controlled, and at the same time, a cursor on a map image may be controlled, based on a touch operation performed on a touch panel (a touch panel provided on the display 12 of the main body apparatus 2, or a touch panel provided on a controller). Thus, game processing may be performed based on operations performed on a touch panel serving as a portion of an operation section.

Further, a control object based on operation data from a controller is not limited to the above virtual camera, cursor, or the like. That is, when a map image is being displayed on a game image, a first control object may be controlled, and at the same time, a second control object may be controlled, based on operation data. The first control object is not limited to the above virtual camera or aiming point, and may be other objects (e.g., a player character, an object, such as a bullet or liquid, that is moved in the game space, an enemy character, other predetermined objects in the game space, etc.). Further, the second control object is not limited to a cursor on a map image, and may be other objects (e.g., a player character, an enemy character, other predetermined objects in the game space, etc.) on a map image. Further, a state of the first control object that has been controlled based on operation data is updated, and when it is determined based on operation data that a predetermined instruction has been given (e.g., by pressing of the ZR-button), a predetermined process may be performed based on the state of the first control object. A state of the second control object that has been controlled based on operation data may be updated, and when it is determined based on operation data that a different instruction has been performed (e.g., by pressing of the A-button), a predetermined process may be performed based on the state of the second control object.

Further, in the above exemplary embodiment, a game is played in which users are competing while operating their respective player characters. In another exemplary embodiment, any suitable game may be played. Further, any suitable information processing may be performed instead of game processing.

Further, in the above exemplary embodiment, it is assumed that images (a game image, and an image obtaining by superimposing a map image on a game image) are displayed on the display 12 of the main body apparatus 2. In another exemplary embodiment, an image may be displayed on another display apparatus (e.g., a television) that is connected to the main body apparatus 2. In this case, when a map image is not being displayed, only a game image captured by a virtual camera provided behind a player character is displayed on the display apparatus, and when a map image is displayed, the map image is displayed on a game image.

Further, the above information processing program (game program) may be executed by any other suitable information processing apparatus. Further, the information processing program may be executed by an information processing system including a plurality of apparatuses. Further, a hardware configuration for executing the information processing program is not limited to those that have been described above. For example, the above process may be performed by an apparatus including a plurality of screens. In this case, a first image (game image) and a second image (map image) may be displayed on one of the plurality of screens, and the second image may be displayed and superimposed on the first image.

This exemplary embodiment has been described above. The description of this exemplary embodiment is merely for illustrative purposes, and various modifications and changes could be made thereto.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein an information processing program to be executed by a computer in an information processing apparatus which performs information processing based on an operation performed on an operation device, and causes a display device to display an image, the program causing the computer to perform execution comprising:

obtaining operation data from the operation device;

controlling a first control object in a virtual space based on the operation data from the operation device;
generating a first image based on control performed on the first control object;
activating control to be performed on a second control object if it is determined based on the operation data that there is a first instruction;
controlling the second control object, based on the operation data from the operation device, in addition to simultaneously controlling the first control object based on the operation data from the operation device, if the control to be performed on the second control object is active, the first control object and the second control object configured to be simultaneously controlled based on orientation data included in the operation data;
generating a second image containing the second control object, and generating a third image obtained by superimposing the second image on the first image, if the control to be performed on the second control object is active; and
causing the display device to display the first image or the third image.

2. The non-transitory computer-readable storage medium according to claim 1, wherein the first control object is controlled based on first data and second data included in the operation data; and
the second control object is controlled based on the first data and third data included in the operation data.

3. The non-transitory computer-readable storage medium according to claim 2, wherein the information processing program causes the computer to perform further execution comprising:
updating a state of the first control object based on the first data, and updating a state of the second control object based on the first data;
performing predetermined information processing based on a state of the first control object if it is determined based on the second data that there is a second instruction; and
performing predetermined information processing based on a state of the second control object if it is determined based on the third data that there is a third instruction.

4. The non-transitory computer-readable storage medium according to claim 2, wherein
the operation device includes at least one of an inertial sensor and a directional input, and a plurality of keys,
the first data is at least one of data output from the inertial sensor and data related to an operation performed on the directional input, and
the second data and the third data are related to operations performed on different ones of the plurality of keys.

5. The non-transitory computer-readable storage medium according to claim 1, wherein
the first control object is a first object or a virtual camera in the virtual space, and the information processing program causes the computer to perform further execution comprising:
performing control to move the first object or the virtual camera, based on the operation data.

6. The non-transitory computer-readable storage medium according to claim 1, wherein
the first control object is configured to determine an aiming point.

7. The non-transitory computer-readable storage medium according to claim 1, wherein the first control object is a virtual camera in the virtual space, and
the first image is an image of the virtual space generated using the virtual camera.

8. The non-transitory computer-readable storage medium according to claim 7, wherein
a predetermined character is provided in the virtual space, and
the information processing program causes the computer to perform further execution comprising:
causing the predetermined character to move in the virtual space based on fourth data included in the operation data.

9. The non-transitory computer-readable storage medium according to claim 8, wherein
the second image is a map image of the virtual space, and
the information processing is for performing a predetermined game.

10. The non-transitory computer-readable storage medium according to claim 9, wherein
the second control object is a cursor displayed on the map image, and
the information processing program causes the computer to perform further execution comprising:
moving the predetermined character to a position in the virtual space indicated by the cursor if it is determined based on third data included in the operation data that there is a third instruction.

11. The non-transitory computer-readable storage medium according to claim 9, wherein
the game is performed by a plurality of information processing apparatuses operated by a plurality of users, and
the information processing program causes the computer to perform further execution comprising:
providing a notification to another information processing apparatus when the third image is being displayed on the display device; and
if receiving the notification from another information processing apparatus, generating the first image which allows for recognition of displaying the third image on a display device of the other information processing apparatus.

12. The non-transitory computer-readable storage medium according to claim 1, wherein the information processing program causes the computer to perform further execution comprising:
if the control to be performed on the second control object is inactive, generating the first image in a first form, and if the control to be performed on the second control object is active, generating the first image in a second form which it is more difficult for a user to visually recognize than in the first form; and
if the control to be performed on the second control object is inactive, causing the display device to display the first image in the first form, and if the control to be performed on the second control object is active, causing the display device to display a third image obtained by superimposing the second image of the first image in the second form.

13. An information processing apparatus for performing information processing based on an operation performed on an operation device, and causing a display device to display an image, the information processing apparatus comprising:
a processor; and a memory configured to store computer readable instructions that, when executed by the processor, cause the information processing apparatus to:
  obtain operation data from the operation device;
  control a first control object in a virtual space based on the operation data from the operation device;
  generate a first image based on control performed on the first control object;
  activate control to be performed on a second control object if it is determined based on the operation data that there is a first instruction;
  control the second control object, based on the operation data from the operation device, in addition to simultaneously controlling the first control object based on the operation data from the operation device, if the control to be performed on the second control object is active, the first control object and the second control object configured to be simultaneously controlled based on orientation data included in the operation data;
  generate a second image containing the second control object, and generate a third image obtained by superimposing the second image on the first image, if the control to be performed on the second control object is active; and
  cause the display device to display the first image or the third image.

14. An information processing system, comprising:
an operation device;
a display device; and
processing circuitry including at least one processor, the processing circuitry configured to:
  obtain operation data from the operation device;
  control a first control object in a virtual space based on the operation data from the operation device;
  generate a first image based on control performed on the first control object;
  activate control to be performed on a second control object if it is determined based on the operation data that there is a first instruction;
  control the second control object, based on the operation data from the operation device, in addition to simultaneously controlling the first control object based on the operation data from the operation device, if the control to be performed on the second control object is active, the first control object and the second control object configured to be simultaneously controlled based on orientation data included in the operation data;
  generate a second image containing the second control object, and generate a third image obtained by superimposing the second image on the first image, if the control to be performed on the second control object is active; and
  cause the display device to display the first image or the third image.

15. The information processing system according to claim 14, wherein
the first control object is controlled based on first data and second data included in the operation data; and
the second control object is controlled based on the first data and third data included in the operation data.

16. The information processing system according to claim 15, wherein
a state of the first control object is updated based on the first data,
a state of the second control object is updated based on the first data,
predetermined information processing is performed based on the state of the first control object if it is determined based on the second data that there is a second instruction, and
predetermined information processing is performed based on the state of the second control object if it is determined based on the third data that there is a third instruction.

17. The information processing system according to claim 15, wherein
the operation device includes at least one of an inertial sensor and a directional input, and a plurality of keys,
the first data is at least one of data output from the inertial sensor and data related to an operation performed on the directional input, and
the second data and the third data are related to operations performed on different ones of the plurality of keys.

18. The information processing system according to claim 14, wherein
the information processing system includes an information processing apparatus for performing the information processing, and
the operation device is a controller attachable to and detachable from the information processing apparatus.

19. An information processing method to be executed by an information processing system which performs information processing based on an operation performed on an operation device, and causes a display device to display an image, the method comprising:
  obtaining operation data from the operation device;
  controlling a first control object in a virtual space based on the operation data from the operation device;
  generating a first image based on control performed on the first control object;
  activating control to be performed on a second control object if it is determined based on the operation data that there is a first instruction;
  controlling the second control object, based on the operation data from the operation device, in addition to simultaneously controlling the first control object, based on the operation data from the operation device, if the control to be performed on the second control object is active, the first control object and the second control object configured to be simultaneously controlled based on orientation data included in the operation data;
  generating a second image containing the second control object, and generating a third image obtained by superimposing the second image on the first image, if the control to be performed on the second control object is active; and
  causing the display device to display the first image or the third image.

20. The non-transitory computer-readable storage medium according to claim 1, wherein
the first control object includes a virtual camera imaging the virtual space and the second control object includes at least a cursor object, and
the virtual camera and the cursor object are simultaneously controlled based on the operation data obtained from the operation device.

21. The non-transitory computer-readable storage medium according to claim 1, wherein the first control object and the second control object are simultaneously controlled based on the operation data obtained from movement of the operation device in free space.

22. An information processing system, comprising:
a display device;
a processor; and
a memory configured to store computer readable instructions that, when executed by the processor, cause the information processing system to:
generate a first image, captured from a virtual camera positioned in a virtual space, for display on the display device;
generate a second image that is superimposed over the first image displayed on the display device based on user operation to an operation device;
obtain operation data from the operation device, the operation data including orientation data corresponding to data output from inertial sensors contained within the operation device;
simultaneously control at least a line-of-sight direction of the virtual camera and a control object displayed, in the second image, on the display device based on the orientation data output from the inertial sensors contained within the operation device.

23. The information processing system of claim 22, wherein the second object includes at least a cursor object.

24. The information processing system of claim 22, wherein a location of the control object is controlled simultaneously with the line-of-sight direction of the virtual camera based on the orientation data output from the inertial sensors.

* * * * *